United States Patent
Sato et al.

(10) Patent No.: US 10,558,413 B2
(45) Date of Patent: Feb. 11, 2020

(54) DEGREE OF INTEREST EVALUATION DEVICE

(71) Applicant: FUJITSU LIMITED, Kawasaki-shi, Kanagawa (JP)

(72) Inventors: Teruyuki Sato, Tama (JP); Koichiro Niinuma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/704,351

(22) Filed: Sep. 14, 2017

(65) Prior Publication Data
US 2018/0095707 A1 Apr. 5, 2018

(30) Foreign Application Priority Data
Sep. 30, 2016 (JP) ................. 2016-195004

(51) Int. Cl.
G06F 3/14 (2006.01)
G06F 3/01 (2006.01)
G06F 3/0485 (2013.01)
G06F 3/0481 (2013.01)

(52) U.S. Cl.
CPC ............ G06F 3/14 (2013.01); G06F 3/011 (2013.01); G06F 3/0485 (2013.01); G06F 3/04817 (2013.01)

(58) Field of Classification Search
CPC .......... G06F 3/14; G06F 3/011; G06F 3/0485; G06F 3/04817; G09G 2354/00; G09G 5/34; G06Q 30/0202
See application file for complete search history.

(56) References Cited

U.S. PATENT DOCUMENTS

| 2010/0169822 A1* | 7/2010 | Hollemans | G06F 3/0485 715/784 |
| 2012/0278742 A1 | 11/2012 | Takami | |
| 2012/0304107 A1* | 11/2012 | Nan | G06F 3/04883 715/781 |
| 2015/0350294 A1 | 12/2015 | Takami | |
| 2017/0344339 A1* | 11/2017 | Molesky | G06F 3/0485 |

FOREIGN PATENT DOCUMENTS

| JP | 2011-113280 | 6/2011 |
| JP | 2012-238114 | 12/2012 |
| JP | 2016-110505 | 6/2016 |

OTHER PUBLICATIONS

English Abstract for JP 2016-110505, published Jun. 20, 2016.
English Abstract for JP 2011-113280, published Jun. 9, 2011.
English Abstract for JP 2012-238114, published Dec. 6, 2012.

* cited by examiner

*Primary Examiner* — Abhishek Sarma
(74) *Attorney, Agent, or Firm* — Staas & Halsey LLP

(57) ABSTRACT

A degree of interest evaluation device includes a memory and a processor coupled to the memory. The processor is configured to: in cases in which input of an operation has been received while content is displayed on an information processing terminal, measure the operation time of the operation; measure a time-wise change of the content being displayed during the operation time; decide on a message to be displayed in accordance with the time-wise change; and display the message decided on in association with the content.

4 Claims, 30 Drawing Sheets

FIG.3

| SCROLLING SPEED (PIXELS/S) | MESSAGE |
|---|---|
| AA1 TO AA2 | ARE YOU LOOKING FOR XXX? |
| AA2 TO AA3 | ALLOW ME TO DESCRIBE IT |
| ... | ... |
| AA(X-1) TO AAX | ARE YOU LOOKING FOR SOMETHING? |

| DEGREE OF INTEREST \ CHANGE AMOUNT OF DEGREE OF INTEREST | HIGH | LOW |
|---|---|---|
| HIGH | INDECISION OVER WHAT IS BEST | DESIRED ITEM NOT FOUND |
| LOW | INTERESTEDNESS IN A SPECIFIC PLACE | DISINTERESTED |

FIG.10

| USER STATE | MESSAGE |
|---|---|
| FIRST STATE | ALLOW ME TO DESCRIBE IT |
| SECOND STATE | ARE YOU LOOKING FOR SOMETHING? |
| THIRD STATE | ARE YOU LOOKING FOR XXX? |
| FOURTH STATE | ARE YOU HAVING TROUBLE? |

FIG.14

| CONTENT ID | CONTENT |
|---|---|
| W W W 1 | UUU |
| W W W 2 | VVV |
| ... | ... |
| W W W 3 | ZZZ |

| USER ID | CONTENT ID | ACCESS TIMING | DEGREE OF INTEREST |
|---------|------------|---------------|--------------------|
| AA1 | WWW1 | yymm:dd1:tt1 | CC1 |
| AA1 | WWW2 | yymm:dd2:tt2 | CC2 |
| ... | ... | ... | ... |
| BB2 | WWW3 | yymm:dd3:tt3 | CC3 |

| INDECISIVE | TROUBLED |
|---|---|
| User058: PRODUCT GROUP A | User061: |
| INTERESTEDNESS | DISINTERESTED |
| User107: PRODUCT b | User083: |

DEGREE OF INTEREST EVALUATION DEVICE

CROSS-REFERENCE TO RELATED APPLICATION

This application is based upon and claims the benefit of priority of the prior Japanese Patent Application No. 2016-195004, filed on Sep. 30, 2016, the entire contents of which are incorporated herein by reference.

FIELD

The embodiments discussed herein are related to a recording medium storing a degree of interest evaluation program, a degree of interest evaluation device.

BACKGROUND

An interestedness timing estimation device that estimates a timing related to interestedness of a user toward content is known. The interestedness timing estimation device acquires usage history that includes usage times for content subject to the estimation of the timing related to the interestedness of the user and for content other than the estimation subject. Then, the interestedness timing estimation device computes usage ratios of the content subject to estimation with respect to content other than the estimation subject from the acquired usage history during respective times. Then, the interestedness timing estimation device estimates a timing related to interestedness of the user toward the content subject to estimation based on the computed usage ratios during the respective times.

Further, a server device that determines a degree of interest toward a webpage provided from a website over the Internet is known. This server device acquires, from a terminal device, scroll operation information for a display region of the terminal device and content specifying information for specifying content displayed in the display region. Then, based on the acquired scroll operation information, the server device computes the degree of interest of the user toward the content specified by the acquired content specifying information.

Further, an interestedness estimation device that estimates a level of interestedness toward respective documents using multiple grades is known. The interestedness estimation device calculates a normalized viewing time for each document viewed by a user, this being a per-character viewing time for the respective viewed document, and generates data expressing a relationship between the normalized viewing times and a corresponding number of viewed documents. The interestedness estimation device then integrates the relationship data over time and normalizes the integrated relationship to update information expressing a per-user relationship between normalized viewing time and an interestedness score. Next, the interestedness estimation device references the information expressing the updated relationship between normalized viewing time and interestedness score to estimate a score indicating a level of interestedness of the user toward a document viewed by the user.

RELATED PATENT DOCUMENTS

Japanese Laid-Open Patent Publication No. 2016-110505
Japanese Laid-Open Patent Publication No. 2011-113280
Japanese Laid-Open Patent Publication No. 2012-238114

SUMMARY

According to an aspect of the embodiments, a non-transitory recording medium stores a degree of interest evaluation program that causes a computer to execute a process. The process includes: in cases in which input of an operation has been received while content is displayed on an information processing terminal, measuring the operation time of the operation; measuring a time-wise change of the content being displayed during the operation time; deciding on a message to be displayed in accordance with the time-wise change; and displaying the message decided on in association with the content.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of messages pre-associated with scrolling speeds.

FIG. 9 is a diagram illustrating an example of user states corresponding to degree of interest and a change amount of a degree of interest.

FIG. 10 is a diagram illustrating an example of messages pre-associated with user states.

FIG. 14 is a diagram illustrating an example of content pre-associated with content IDs.

FIG. 15 is a diagram illustrating an example of access history and degree of interest pre-associated with user IDs.

FIG. 23 is a diagram illustrating an example of a display in which products specified from a user ID and user operation information are associated with user states.

DESCRIPTION OF EMBODIMENTS

Exemplary embodiments of technology disclosed herein are described in detail below, with reference to the drawings.
User Viewing Activity on a Web Site Consider a situation in which the user holds an information processing terminal in their hand and views displayed content while performing input operations such as instructing the displayed content to scroll. In such cases, it is conceivable that user interest information obtained on the basis of the input operations may be utilized to provide feedback to the user.

For example, in cases in which the user is viewing specific content on an electronic commerce (EC) site, a conceivable example of feedback that utilizes user interest information is a recommendation of content different from the content the user is viewing. However, in terms of whether or not this serves the customer sufficiently, it is conceivable that simply recommending other content may be insufficient.

Further, recommendations based on user interest information may cause the user to feel annoyed by the information presented when information related to recommendations is presented continuously. There is accordingly a possibility that user impressions toward the content of the EC site will worsen and views on the web site by users will decrease. When acquiring user interest information, there is therefore demand for a presentation method that is mindful of "high quality customer service" and that is not considered to be a nuisance by users when giving feedback.

Thus, in the present exemplary embodiment, there is interaction close to that of verbal remarks in an actual store when presenting information based on the interest information of the user viewing the content.

Figure 1:
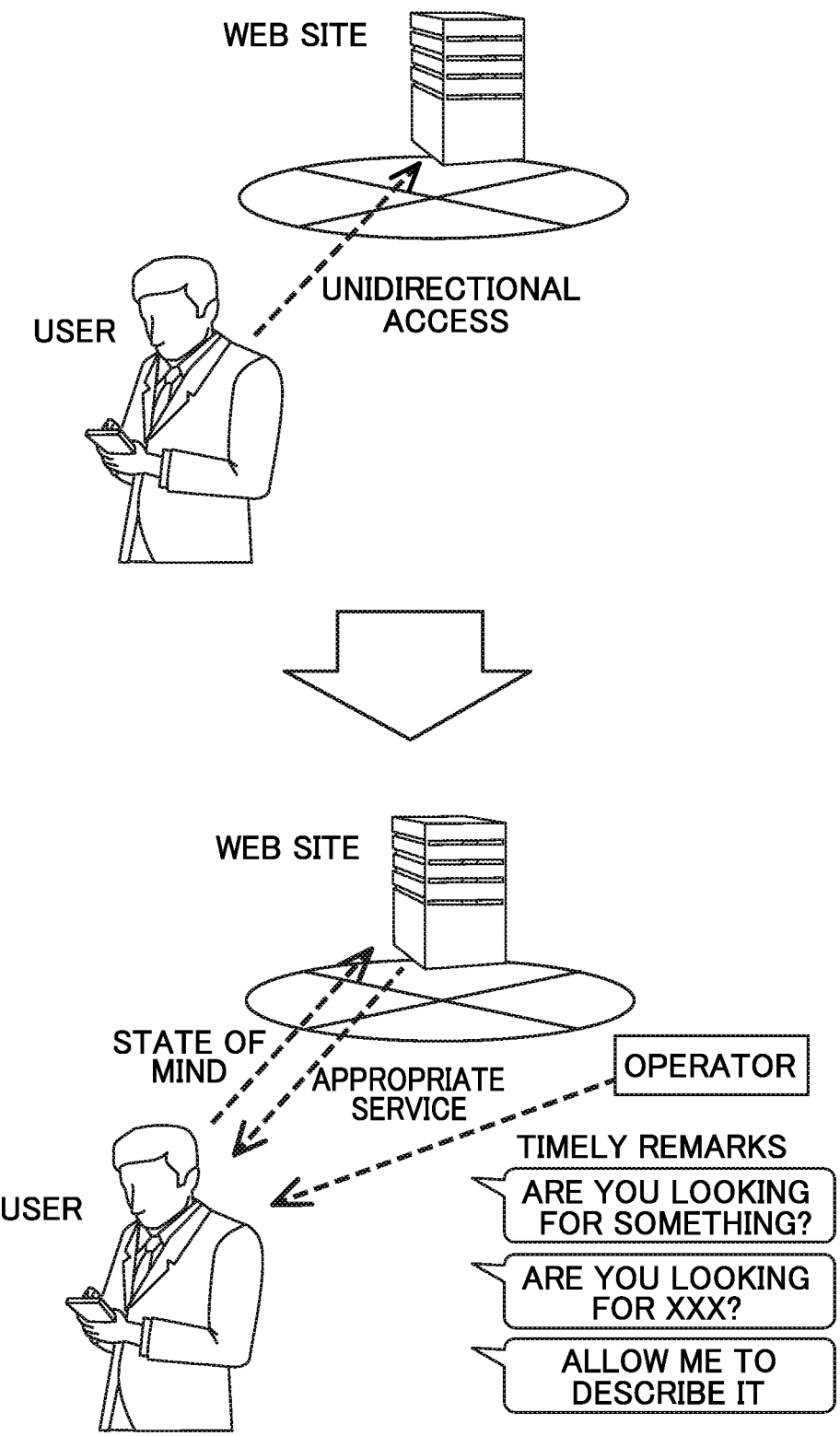
FIG. 1 is an explanatory diagram for explaining an example of services for a user.

More specifically, in the present exemplary embodiment, rather than just a user accessing website content as illustrated at the upper side of FIG. 1, appropriate services are provided based on the state of mind of the user viewing the content of a webpage as illustrated at the lower side of FIG. 1. More specifically, when presenting information to the user, presenting such that in addition to the timing of information presentation, the contents of the information presentation are also appropriately changed enables customer service close to that of an actual store to be achieved on the web. For example, as illustrated at the lower side of FIG. 1, a message such as "are you looking for something?", "are you looking for XXX?", or "allow me to describe it" is decided on in accordance with user interest information, and the message decided on is presented to the user.

Appropriate information is accordingly presented to the user at an appropriate time in accordance with the user interest information, thereby enabling an increase the conversion rate (CVR) on the EC site or new services unique to information processing terminals such as smartphones, for example. Further, when presenting information to the user, presenting information such that in addition to presentation timing, appropriate changes are also made to the presented content enables customer service close to that of an actual store to be achieved for content posted on the web.

First Exemplary Embodiment

Figure 2:
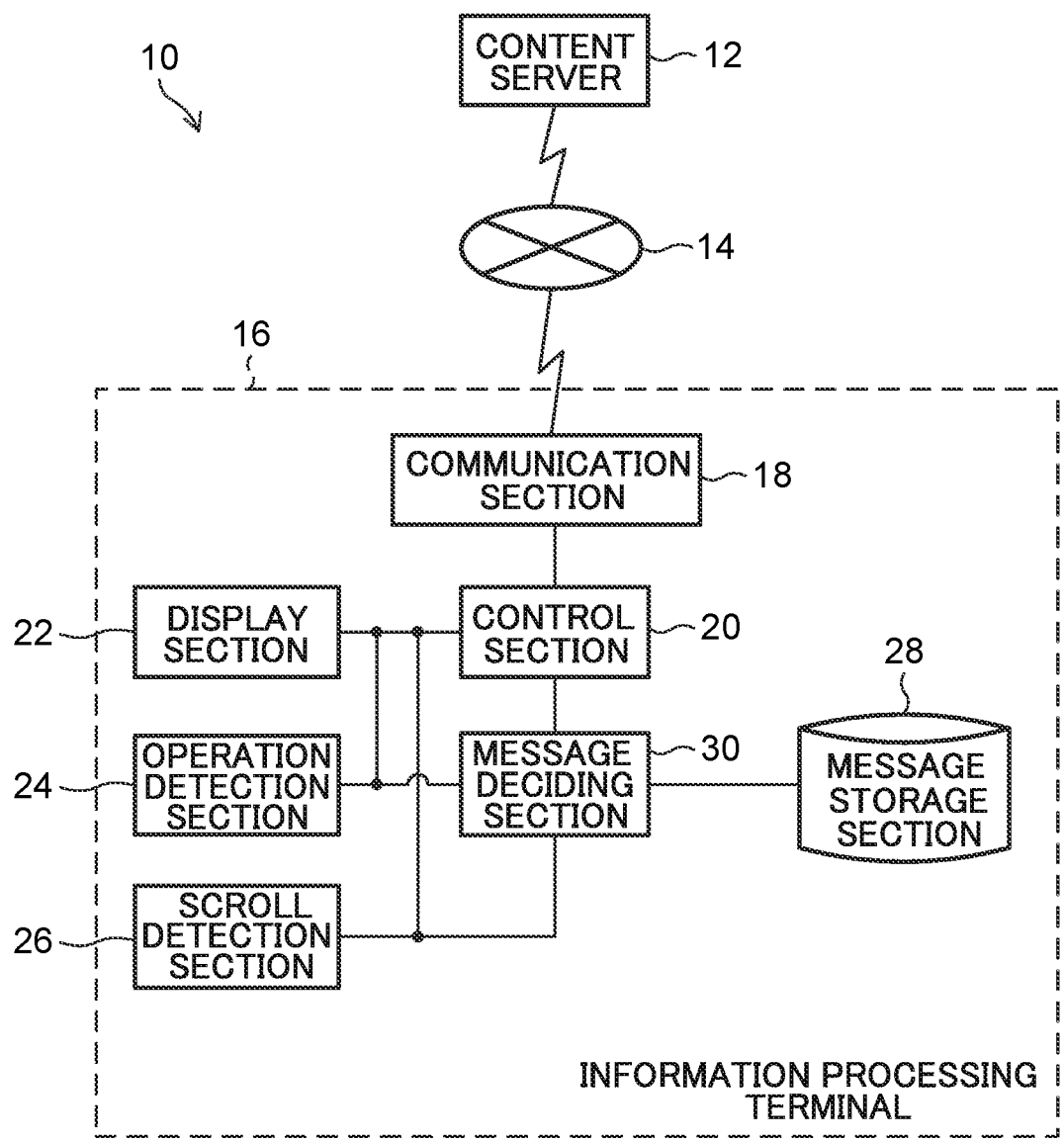
FIG. 2 is a schematic block diagram of an information presentation system according to a first exemplary embodiment.

An information presentation system 10 illustrated in FIG. 2 includes a content server 12 and an information processing terminal 16. The content server 12 and the information processing terminal 16 are, for example, connected to each other via a network 14 such as the Internet.

The content server 12 transmits content to the information processing terminal 16 in accordance with a content request signal from the information processing terminal 16.

The information processing terminal 16 includes a communication section 18, a control section 20, a display section 22, an operation detection section 24, a scroll detection section 26, a message storage section 28, and a message deciding section 30.

The communication section 18 exchanges information with the content server 12. For example, the communication section 18 receives content transmitted from the content server 12. Further, the communication section 18 transmits a content request signal output by the control section 20, described below, to the content server 12.

The control section 20 controls the display section 22, described later, such that content received from the communication section 18 is displayed. Further, the control section 20 controls the display section 22 so that content the user desires is displayed in accordance with user operation information detected by the operation detection section 24 and scrolled amounts detected by the scroll detection section 26, described later.

The display section 22 is implemented by, for example, a liquid crystal display (LCD) or an organic electroluminescent display (OELD). The display section 22 displays content in accordance with control by the control section 20. Note that as long as the content provided from the content server 12 can be displayed on the display section 22, the content may be content including text such as a document or content including images.

The operation detection section 24 receives input of operations by the user from a touch panel superimposed on the display section 22 and detects input operations by the user while the content is displayed on the information processing terminal 16. More specifically, the operation detection section 24 detects types of input operation by the user, such as tapping, flicking, swiping, pinching, or scrolling. Further, the operation detection section 24 detects coordinates of a position of contact between the finger of the user and the touch panel at the timing of the input operation. The operation detection section 24 then measures an operation time in which scrolling is performed within a unit of time. Accordingly, operation information including the types of input operations, the timings of input operations, contact positions, and scroll operation times within each unit of time is detected by the operation detection section 24. The operation detection section is an example of an operation measurement section of technology disclosed herein.

The scroll detection section 26 measures scrolling speed, which is an example of a time-wise change of displayed content during the scroll operation time measured by the operation detection section 24. The scrolling speed represents the speed of scrolling on the screen displaying the content. More specifically, the scroll detection section 26 detects a scrolled amount (pixels) on the screen input by the user from a touch panel superimposed on the display section 22. The scroll detection section 26 then measures the scrolling speed (pixels/s) by dividing the scrolled amount by the scroll operation time (s) the detected by the operation detection section 24. The scroll detection section is an example of a change measurement section of technology disclosed herein.

Plural messages pre-associated with scrolling speeds are stored in the message storage section 28. For example, messages describing specific content in detail and general remark messages are stored in accordance with scrolling speeds as the plural messages. For example, messages that describe content in detail are associated with lower scrolling speeds. Further, for example, a general remark message is associated with scrolling speeds greater than a predetermined threshold value. The plural messages are, for example, stored in the form of a table such as that illustrated in FIG. 3. Messages are stored in the table 3A illustrated in FIG. 3 in association with a scrolling speed (pixels/s). For example, a message stating "are you looking for XXX?" is associated with scrolling speeds of from AA1 (pixels/s) to AA2 (pixels/s). Further, a message stating "allow me to describe it" is associated with scrolling speeds of from AA2 (pixels/s) to AA3 (pixels/s). A message stating "are you looking for something?" is associated with scrolling speeds of from AA(X−1) (pixels/s) to AAX (pixels/s). Note that the scrolling speeds are in sequence such that AA1<AA2< . . . <AA(X−1)<AAX.

Messages corresponding to a user having a relatively low interest toward the content in cases in which the scrolling speed is greater than a predetermined threshold value are stored in the message storage section 28. Further, messages corresponding to a user having a relatively high interest toward the content in cases in which the scrolling speed is lower than a predetermined threshold value are also stored in the message storage section 28.

For example, when the scrolling speed of a scroll operation by the user is greater than the predetermined threshold value, this can be considered to indicate a state in which the desired target in the content has not been found. Alternatively, this could be considered to indicate a state of disinterest toward the content. Accordingly, in the present exemplary embodiment, when scrolling speed is greater than the predetermined threshold value, the interest of the user toward the content is considered to be in a relatively low state, and, for example, the message "are you looking for something?" corresponding to a low state of interest is output. Messages corresponding to states of relatively low interest are stored as general remark messages.

On the other hand, when the scrolling speed of a scroll operation by the user is below a predetermined threshold value, the user can, for example, be considered to be in a state of indecision over what is best out of targets in the content. Alternatively, this could be considered to indicate a state of interestedness in a specific place in the content. Accordingly, in the present exemplary embodiment, when the scrolling speed is less than a predetermined threshold value, the interest of the user toward the content is considered to be in a relatively high state, and, for example, the message "are you looking for XXX?" corresponding to a high state of interest is output. Messages corresponding to states of relatively high interest are stored as messages describing the content in detail.

The message deciding section 30 decides on messages to be displayed on the display section 22 in accordance with the scrolling speed measured by the scroll detection section 26. More specifically, the message deciding section 30 selects a message according to the scrolling speed from out of the plural messages stored in the message storage section 28, and assigns the message for display on the display section 22.

Note that when the message stating, for example, "are you looking for XXX?" has been selected, the message deciding section 30 acquires information corresponding to "XXX" based on the operation information obtained by the operation detection section 24 and the content being displayed. Since the input operation timings and contact positions are included in the operation information, the message deciding section 30 acquires the contact positions of operations from the operations information and generates a message corresponding to a place specified by the contact position and the content. For example, when a place related to a cookbook has been specified from a contact position of operation information detected by the operation detection section 24 and the content being displayed, a message stating "are you looking for a cookbook?" is generated and the message is assigned for display on the display section 22.

The control section 20 controls the display section 22 such that the message decided on by the message deciding section 30 is displayed in association with the content. The display section 22 then displays the message in association with the content, the user reads the message, and content corresponding to the displayed message is displayed if, for example, the user touches the message. For example, content related to "XXX" may be displayed when a message stating "are you looking for XXX?" has been touched. Further, for example, content describing, in detail, a product or the like being viewed by the user may be displayed when a message stating "allow me to describe it" has been touched.

Figure 4:
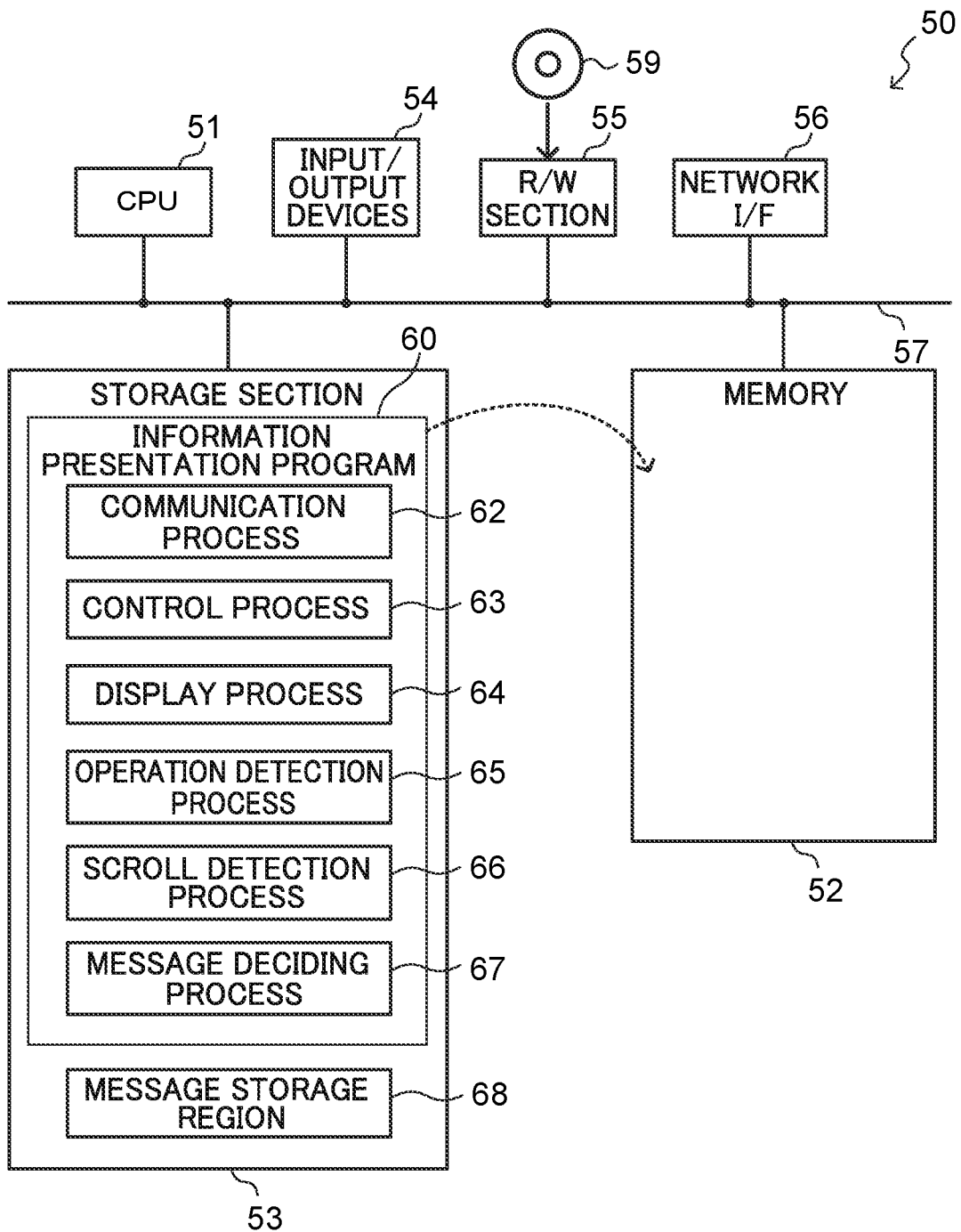
FIG. 4 is a block diagram illustrating a schematic configuration of a computer that functions as an information processing terminal according to the first exemplary embodiment.

The information processing terminal 16 may, for example, be implemented by a computer 50 illustrated in FIG. 4. The computer 50 includes a CPU 51, memory 52 serving as a temporary storage region, and a non-volatile storage section 53. Further, the computer 50 includes input/output devices 54 such as a display device and an input device, and a read/write (R/W) section 55 that controls reading and writing of data from and to a recording medium 59. Further, the computer 50 includes a network interface (I/F) 56 connected to a network such as the Internet. The CPU 51, the memory 52, the storage section 53, the input/output devices 54, the R/W section 55, and the network I/F 56 are connected to one another via a bus 57.

The storage section 53 may be implemented by a hard disk drive (HDD), a solid state drive (SSD), flash memory, or the like. An information presentation program 60 for causing the computer 50 to function as the information processing terminal 16 is stored in the storage section 53, which serves as a storage medium. The information presentation program 60 includes a communication process 62, a control process 63, a display process 64, an operation detection process 65, a scroll detection process 66, and a message deciding process 67. Further, the storage section 53 includes a message storage region 68 for storing information configuring the message storage section 28. The information presentation program is an example of a degree of interest evaluation program of technology disclosed herein.

The CPU 51 reads the information presentation program 60 from the storage section 53, expands the information presentation program 60 into the memory 52, and sequentially executes the processes included in the information presentation program 60. The CPU 51 operates as the communication section 18 illustrated in FIG. 2 by executing the communication process 62. Further, the CPU 51 operates as the control section 20 illustrated in FIG. 2 by executing the control process 63. Further, the CPU 51 operates as the display section 22 illustrated in FIG. 2 by executing the display process 64. Further, the CPU 51 operates as the operation detection section 24 illustrated in FIG. 2 by executing the operation detection process 65. Further, the CPU 51 operates as the scroll detection section 26 illustrated in FIG. 2 by executing the scroll detection process 66. Further, the CPU 51 operates as the message deciding section 30 illustrated in FIG. 2 by executing the message deciding process 67. Further, the CPU 51 reads information from the message storage region 68 and expands the message storage section 28 into the memory 52. The computer 50, which executes the information presentation program 60, thereby functions as the information processing terminal 16.

Note that the functionality implemented by the information presentation program 60 may, for example, be implemented by a semiconductor integrated circuit, and more specifically, by an application specific integrated circuit (ASIC) or the like.

Figure 5:
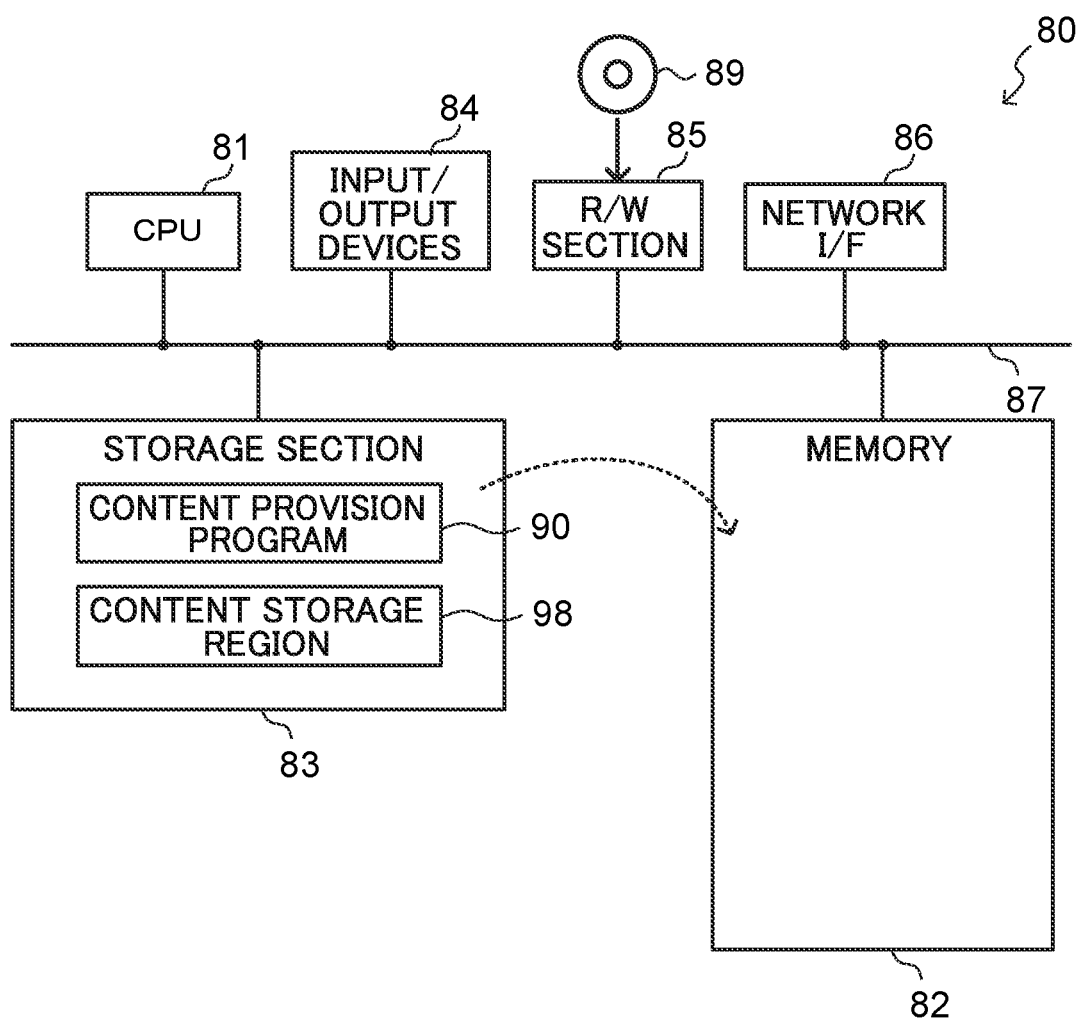
FIG. 5 is a block diagram illustrating a schematic configuration of a computer that functions as a content server according to the first exemplary embodiment.

Further, the content server 12 may, for example, be implemented by a computer 80 illustrated in FIG. 5. The computer 80 includes a CPU 81, memory 82 serving as a temporary storage region, and a non-volatile storage section 83. Further, the computer 80 includes input/output devices 84 such as a display device and an input device, and an R/W section 85 that controls reading and writing of data from and to a recording medium 89. Further, the computer 80 includes a network I/F 86 connected to a network such as the Internet. The CPU 81, the memory 82, the storage section 83, the input/output devices 84, the R/W section 85, and the network I/F 86 are connected to one another via a bus 87.

The storage section 83 may, for example, be implemented by a HDD, an SSD, flash memory, or the like. A content provision program 90 for causing the computer 80 to function as the content server 12 is stored in the storage section 83, which serves as a storage medium. Further, content that can be provided to the information processing terminal 16 is stored in a content storage region 98 in advance.

Note that functionality implemented by the content provision program 90 may, for example, be implemented by a semiconductor integrated circuit, and more specifically, by an ASIC or the like.

Figure 6:
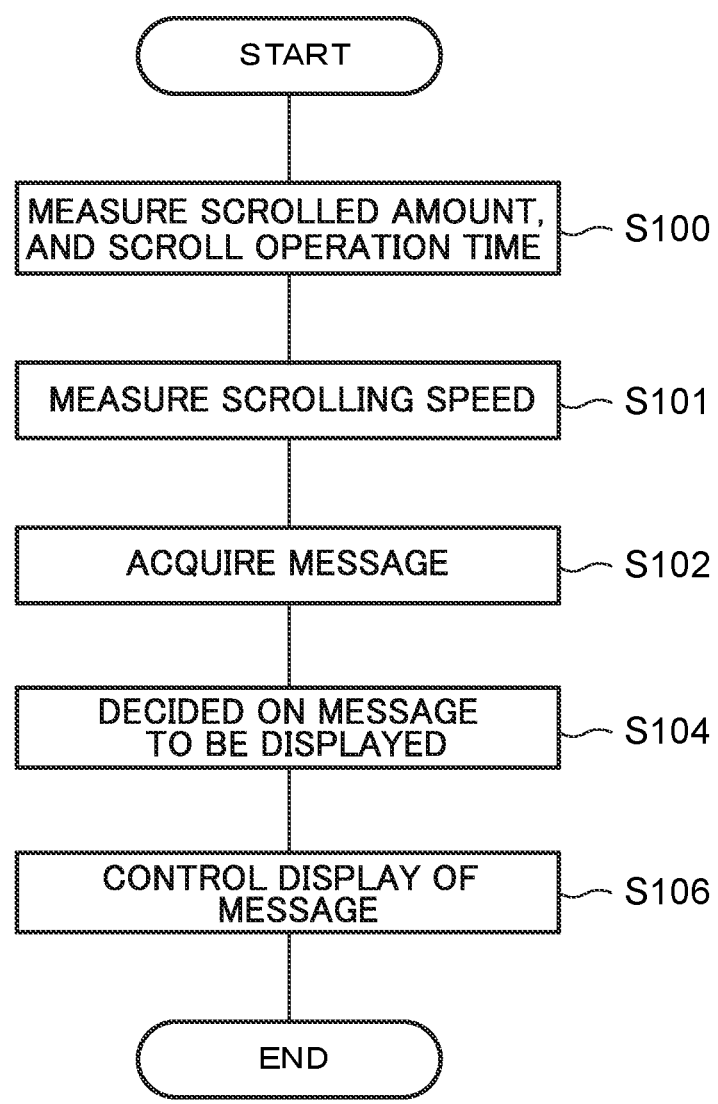
FIG. 6 is a flowchart illustrating an example of information presentation processing in the first exemplary embodiment.

Next, operation of the information presentation system 10 according to the first exemplary embodiment is described. In the information presentation system 10, the information processing terminal 16 receives content from the content server 12. Then, the received content is displayed on the display section 22 of the information processing terminal 16 and the information presentation processing illustrated in FIG. 6 is repeatedly executed in the information processing terminal 16 in respective units of time when the operation detection section 24 receives an input operation from the user. The processing is described in detail below.

At step S100, the operation detection section 24 measures the operation time by the user within the unit of time, and the scroll detection section 26 detects a scrolled amount on the screen input by the user from the touch panel superimposed on the display section 22.

At step S101, the scroll detection section 26, divides the detected scrolled amount by the scroll operation time detected at step S100 above to measure the scrolling speed (pixels/s).

At step S102, the message deciding section 30 acquires a message corresponding to the scrolling speed detected at step S101 above from the plural messages stored in the message storage section 28.

At step S104, the message deciding section 30 decides on, as a message to be displayed, a message generated from the message acquired at step S102 above or the message itself. For example, when a message stating "are you looking for XXX?" is acquired from the message storage section 28 in correspondence with the scrolling speed measured at step S101 above, the message deciding section 30 acquires operation information corresponding to "XXX" from the operation detection section 24. The message deciding section 30 then generates a message in accordance with a place corresponding to the contact position within the operation information, and the generated message is decided on as the message to be displayed.

At step S106, the control section 20 controls the display section 22 such that the message decided on at step S104 above is displayed in association with the content, and the information presentation processing ends. The message is displayed in association with the content on the display section 22.

As described above, the information processing terminal according to the first exemplary embodiment measures the operation time of the operation when input of an operation has been received during display of the content on the information processing terminal. The information processing terminal then measures the time-wise change of the displayed content during the operation time, and decides on a message to be displayed in accordance with the time-wise change. The information processing terminal then displays the message decided on in association with the content. This enables an appropriate message to be presented in accordance with the state of the user.

Further, an information processing terminal such as a smart device can be used to achieve high quality customer service for the information presentation based on the level of interest of a user browsing content on the web.

Second Exemplary Embodiment

Next, a second exemplary embodiment of technology disclosed herein is described. Note that portions that are the same as those of the first exemplary embodiment are allocated the same reference numerals and detailed explanation thereof is omitted.

In the second exemplary embodiment, the method for estimating the level of interest of the user toward the content based on the operation information from the user differs from that of the first exemplary embodiment.

Figure 7:
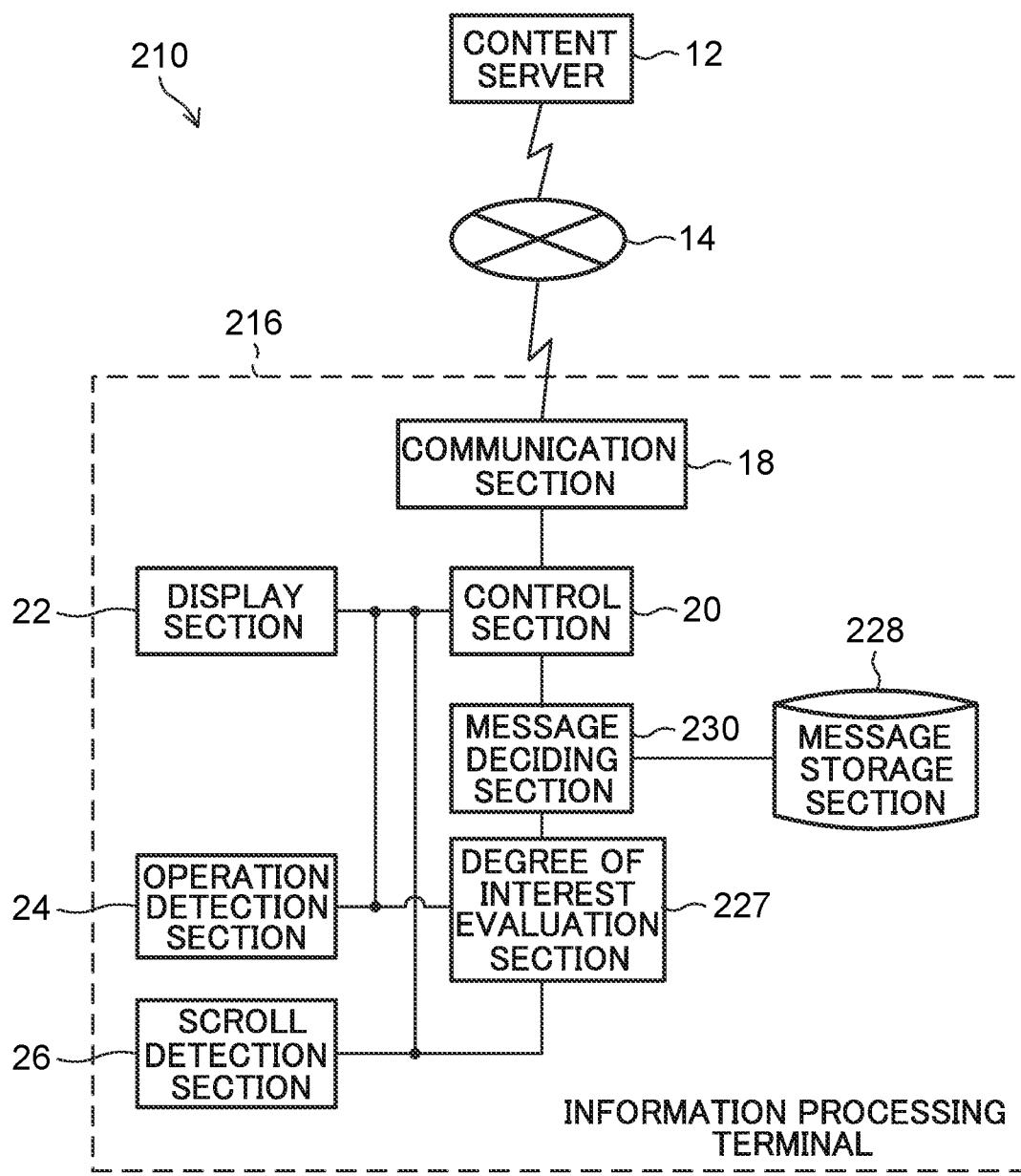
FIG. 7 is a schematic block diagram of an information presentation system according to a second exemplary embodiment.

An information presentation system 210 according to the second exemplary embodiment illustrated in FIG. 7 includes the content server 12 and an information processing terminal 216. The content server 12 and the information processing terminal 216 are, for example, connected to each other via a network 14 such as the Internet.

The information processing terminal 216 includes the communication section 18, the control section 20, the display section 22, the operation detection section 24, the scroll detection section 26, a message storage section 228, a degree of interest evaluation section 227, and a message deciding section 230.

The operation detection section 24 of the second exemplary embodiment also measures non-operation time in which input operations are not performed within the units of time. Accordingly, the operation detection section 24 of the second exemplary embodiment detects operation information including the types of input operations, the timings of input operations, contact positions, scroll operation times, and non-operation time in each unit of time.

The degree of interest evaluation section 227 computes a degree of interest representing the level of interest of the user toward the content based on the scroll operation time and the non-operation time measured by the operation detection section 24, and the scrolling speed measured by the scroll detection section 26.

For example, the degree of interest evaluation section 227 acquires a pre-set weight coefficient in accordance with the scrolling speed detected by the scroll detection section 26. The degree of interest evaluation section 227 then computes a degree of interest I(t) of the user toward the content according to Equation (1) below, based on the scroll operation time, the non-operation time, and the scrolling speed weight coefficient.

$$I(t) = \Sigma(\text{scroll operation time/scrolling speed weight coefficient}) + \Sigma \text{non-operation time} \quad (1)$$

In the present exemplary embodiment, a degree of interest I(t) toward the content is computed for each unit of time (for example, one second). In Equation (1), "scroll operation time" represents a scroll operation time within the unit of time, and a "non-operation time" represents a non-operation time within the unit of time. For each item of content, the degree of interest I(t) is computed in the form of a value integrated with respect to respective units of time from a timing at which display of the content started to a timing t, as expressed by Equation (1) above.

Figure 8:
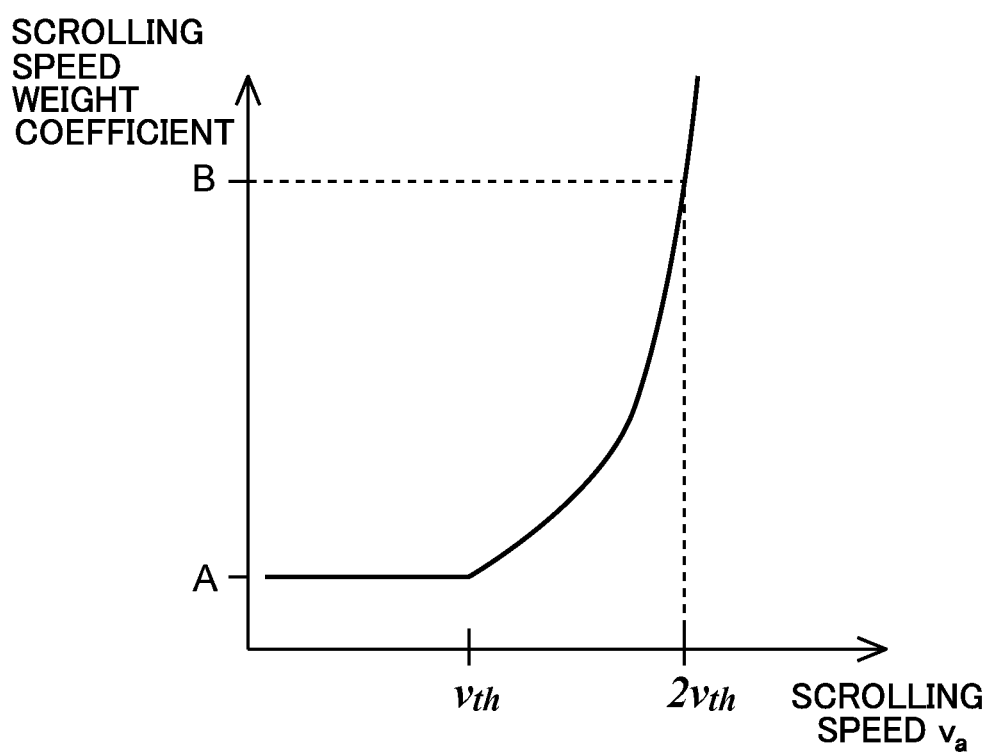
FIG. 8 is a diagram illustrating an example of a pre-set weight coefficients according to scrolling speeds.

Further, an example of a method of setting the scrolling speed weight coefficient is illustrated in FIG. 8. As illustrated in FIG. 8, configuration may be made such that for scrolling speeds $v_a$ of from 0 to a threshold value $v_{th}$ the weight coefficient is set to a constant value, and in the case of scrolling speeds $v_a$ of the threshold value $v_{th}$ or greater, the weight coefficient is pre-set so as to increase as scrolling speed $v_a$ increases. For example, as illustrated in FIG. 8, the scrolling speed weight coefficient $v_a$ is pre-set so as to increase from A to B as scrolling speed $v_a$ increases from the threshold value $v_{th}$ to $2v_{th}$.

Further, the degree of interest evaluation section 227 computes a degree of interest for each unit of time, and computes, as a change amount of the degree of interest, the difference between the degree of interest computed using the unit of time of the previous timing and the degree of interest computed using the unit of time of the current timing. The degree of interest evaluation section 227 identifies user states based on the computed degree of interest and the change amount of the degree of interest. When the user is viewing a website, states with respect to content included in the website conceivably include not only simple states such as interestedness or disinterest, but also, for example, a state of indecision over what is best and a state of not finding a desired item. Therefore, the present exemplary embodiment identifies what kind of state the user is in based on the degree of interest and the change amount of the degree of interest. Messages to be output are then changed in accordance with the user state.

Note that although the change amount of the degree of interest is defined as the difference between the degree of interest computed using the unit of time of the previous timing and the degree of interest computed using the unit of time of the current timing here, the reciprocal of the number of operations within the units of time may be employed instead.

Here, messages to be output are organized such that the activity of the user on the webpage is matched to activity in an actual store. FIG. 9 illustrates examples of user states according to degree of interest and change amount of the degree of interest. As illustrated in FIG. 9, states corresponding to user activity on the web can be categorized based on imagined user activity in an actual store.

More specifically, as illustrated in FIG. 9, the degree of interest evaluation section 227 identifies a first state indicating a state of indecision over what is best when the degree of interest is high and the change amount of the degree of interest is also high. Further, the degree of interest evaluation section 227 identifies a second state indicating a state of a desired item not being found when the degree of interest is high and the change amount of the degree of interest is low. Further, the degree of interest evaluation section 227 identifies a third state indicating a state of interestedness in a specific place when the degree of interest is small and the change amount of the degree of interest is high. Further, the degree of interest evaluation section 227 identifies a fourth state indicating a state of disinterest when the degree of interest is low and the change amount of the degree of interest is low.

Plural messages pre-associated with user states are stored in the message storage section 228. The plural messages are, for example, stored in the form of a table such as that illustrated in FIG. 10. Messages are stored in a table 10A illustrated in FIG. 10 according to degree of interest and change amount of the degree of interest. For example, a message stating "allow me to describe it" is associated with the first state indicating a state in which the degree of interest is high and the change amount of the degree of interest is also high. Further, a message stating "are you looking for something?" is associated with the second state indicating a state in which the degree of interest is high and the change amount of the degree of interest is low. Further, a message stating "are you looking for XXX?" is associated with the third state indicating a state in which the degree of interest is low and the change amount of the degree of interest is high. Further, a message stating "are you having trouble?" is associated with the fourth state indicating a state in which the degree of interest is low and the change amount of the degree of interest is low. Note that configuration may be made such that no message is associated with the fourth state and no message is output when the fourth state is identified. Note that the magnitude of the degree of interest and the change amount of the degree of interest are determined as being "high" when greater than a pre-set threshold value or "low" when less than or equal to the threshold value.

The messages corresponding to the first state and the third state are stored as messages that describe the content in detail. Further, the messages corresponding to the second state and the fourth state are stored as general remark messages. More specifically, the message corresponding to the first state is a message related to alleviating user indecision toward the content and the message corresponding to the second state is a message related to the user searching for content. Further, the message corresponding to the third state is a message related to user interestedness in specific content and the message corresponding to the fourth state is a message related to user disinterest in specific content.

The message deciding section 230 decides on messages to be displayed on the display section 22 in accordance with the user state identified by the degree of interest evaluation section 227. More specifically, the message deciding section 230 selects the message corresponding to the user state identified by the degree of interest evaluation section 227 from the plural messages stored in the message storage section 228 and assigns the selected message as the message to be displayed on the display section 22. Note that the message deciding section 230, for example, acquires a contact position corresponding to "XXX" from the operation information when the message stating "are you looking for XXX?" has been selected, and generates a message in accordance with the place corresponding to the contact position. The target of user interest can thereby be specified utilizing the fact that operation timings and positions are specified by scroll operations made by the user contacting the touch panel or using a mouse.

Figure 11:
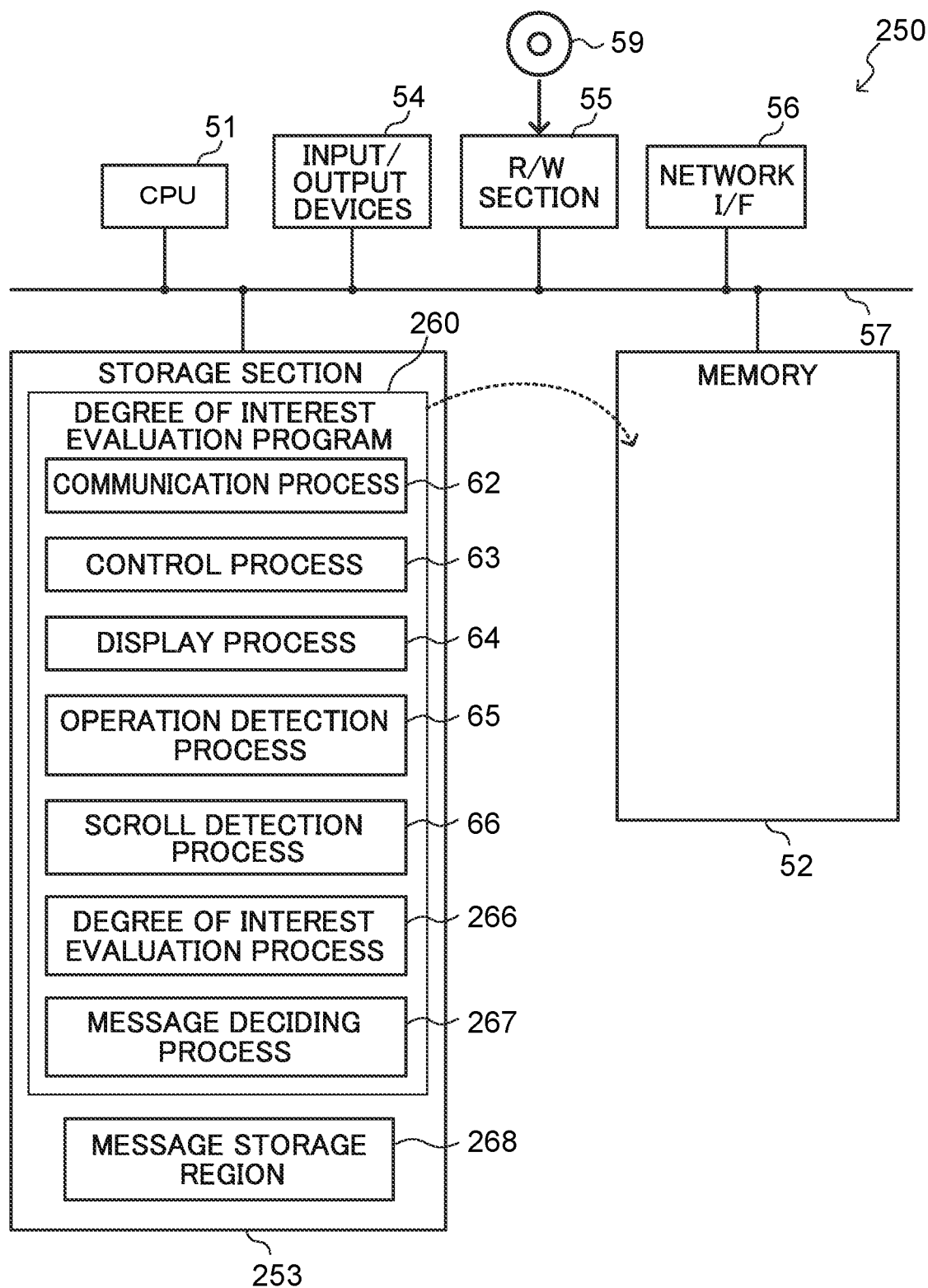
FIG. 11 is a block diagram illustrating a schematic configuration of a computer that functions as an information processing terminal according to the second exemplary embodiment.

The information processing terminal 216 may, for example, be implemented by a computer 250 illustrated in FIG. 11. The computer 250 includes a CPU 51, memory 52 serving as a temporary storage region, and a non-volatile storage section 253. Further, the computer 250 includes input/output devices 54 such as a display device and an input device, and an R/W section 55 that controls reading and writing of data from and to a recording medium 59. Further, the computer 250 includes a network I/F 56 connected to a network such as the Internet. The CPU 51, the memory 52, the storage section 253, the input/output devices 54, the R/W section 55, and the network I/F 56 are connected to one another via a bus 57.

The storage section 253 may, for example, be implemented by a HDD, an SSD, flash memory, or the like. A degree of interest evaluation program 260 for causing the computer 250 to function as the information processing terminal 216 is stored in the storage section 253, which serves as a storage medium. The degree of interest evaluation program 260 includes the communication process 62, the control process 63, the display process 64, the operation detection process 65, the scroll detection process 66, a degree of interest evaluation process 266, and a message deciding process 267. Further, the storage section 253 includes a message storage region 268 storing information configuring the message storage section 228.

The CPU 51 reads the degree of interest evaluation program 260 from the storage section 53, expands the degree of interest evaluation program 260 into the memory 52, and sequentially executes the processes included in the degree of interest evaluation program 260. The CPU 51 operates as the communication section 18 illustrated in FIG. 7 by executing the communication process 62. Further, the CPU 51 operates as the control section 20 illustrated in FIG. 7 by executing the control process 63. Further, the CPU 51 operates as the display section 22 illustrated in FIG. 7 by executing the display process 64. Further, the CPU 51 operates as the operation detection section 24 illustrated in FIG. 7 by executing the operation detection process 65. Further, the CPU 51 operates as the scroll detection section 26 illustrated in FIG. 7 by executing the scroll detection process 66. Further, the CPU 51 operates as the degree of interest evaluation section 227 illustrated in FIG. 7 by executing the degree of interest evaluation process 266. Further, the CPU 51 operates as the message deciding section 230 illustrated in FIG. 7 by executing the message deciding process 267. Further, the CPU 51 reads information from the message storage region 268 and expands the message storage section 228 into the memory 52. The computer 250, which executes the degree of interest evaluation program 260, thereby functions as the information processing terminal 216.

Note that the functionality implemented by the degree of interest evaluation program 260 may, for example, be implemented by a semiconductor integrated circuit, and more specifically, by an ASIC or the like.

Figure 12:
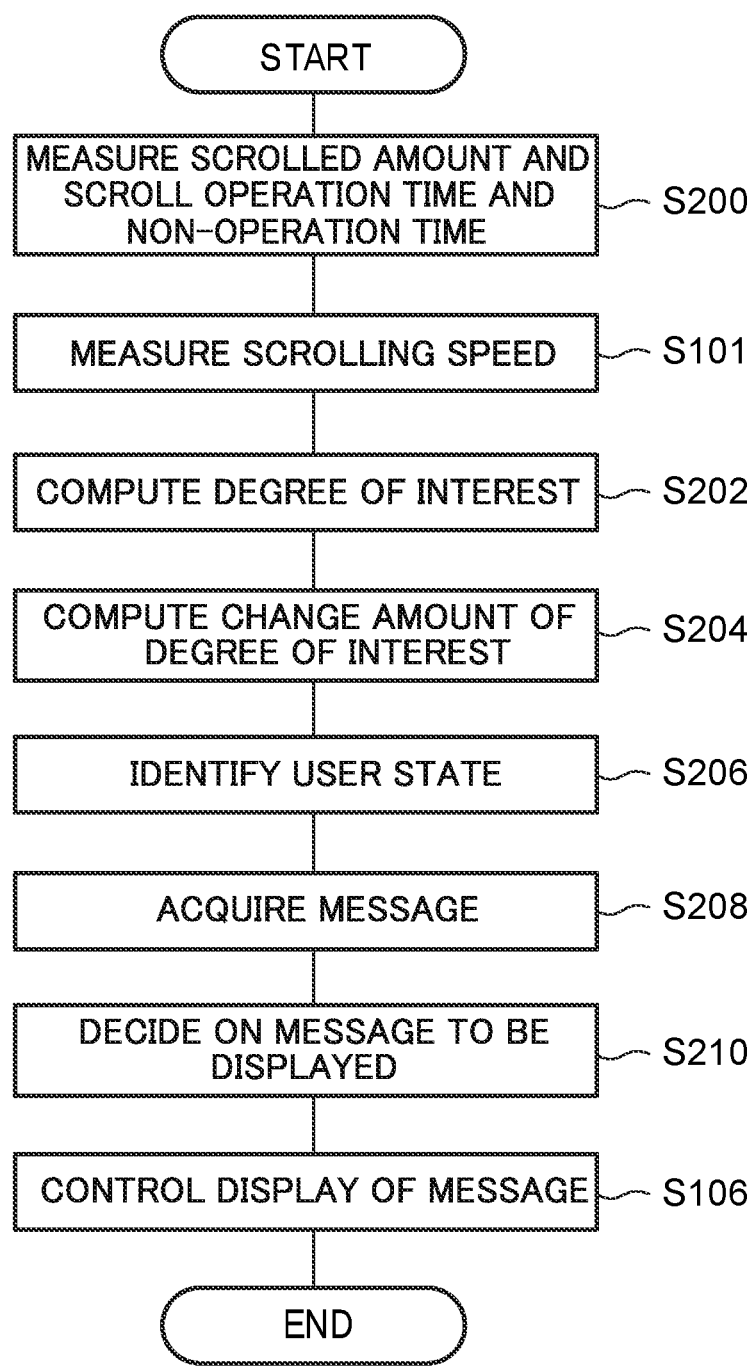
FIG. 12 is a flowchart illustrating an example of degree of interest evaluation processing of the second exemplary embodiment.

Next, operation of the information presentation system 210 according to the second exemplary embodiment is described. In the information presentation system 210, the information processing terminal 216 receives content from the content server 12. The received content is then displayed on the display section 22 of the information processing terminal 216, and when the operation detection section 24 receives input of an operation by the user, the degree of interest evaluation processing illustrated in FIG. 12 is repeatedly executed in respective units of time in the information processing terminal 216. Detailed explanation follows regarding the processing.

At step S200, the operation detection section 24 measures operation time and non-operation time by the user within the unit of time, and the scroll detection section 26 detects a scrolled amount on the screen that was input by the user from the touch panel superimposed on the display section 22.

At step S202, the degree of interest evaluation section 227 sets the scrolling speed weight coefficient in accordance with the scrolling speed detected at step S101. The degree of interest evaluation section 227 then computes the degree of interest of the user according to Equation (1) above, based on the scroll operation time and non-operation time detected at step S100, the scrolling speed detected at step S101, and the set scrolling speed weight coefficient.

At step S204, the degree of interest evaluation section 227 computes, as the change amount of the degree of interest, the difference between the degree of interest computed by the degree of interest evaluation processing the previous time and the degree of interest computed at step S202 above.

At step S206, the degree of interest evaluation section 227 identifies the user state based on the degree of interest of the user computed at step S202 above and the change amount of the degree of interest computed at step S204 above. More specifically, the degree of interest evaluation section 227 identifies the first user state in cases in which the degree of interest is greater than a threshold value and the change amount of the degree of interest is also greater than a threshold value. Further, the degree of interest evaluation section 227 identifies the second state in cases in which the degree of interest is greater than a threshold value and the change amount of the degree of interest is lower than a threshold value. Further, the degree of interest evaluation section 227 identifies the third state in cases in which the degree of interest is a threshold value or lower and the change amount of the degree of interest is greater than a threshold value. Further, the degree of interest evaluation section 227 identifies the fourth state in cases in which the degree of interest a threshold value or lower and the change amount of the degree of interest is a threshold value or lower.

At step S208, the message deciding section 230 acquires a message corresponding to the user state identified at step S206 above from the plural messages stored in the message storage section 228.

At step S210, the message deciding section 230 decides on, as a message to be displayed, the message acquired at step S208 above or a message generated from the message. For example, in cases in which a message stating "are you looking for XXX?" has been acquired from the message storage section 228, the message deciding section 230 acquires information corresponding to the contact position of the user and generates the message to be displayed with the information corresponding to the contact position inserted in place of "XXX".

At step S106, the control section 20 controls the display section 22 such that the message decided on at step S104 above is displayed in association with the content, and the information presentation processing ends.

As described above, when deciding on the message to be displayed, the information processing terminal according to the second exemplary embodiment computes a degree of interest representing a level of interest of the user toward the content based on the operation time of the user and the scrolling speed. Then, based on the degree of interest, the information processing terminal computes a change amount of the degree of interest. The information processing terminal then identifies the user state based on the degree of interest and the change amount of the degree of interest. The information processing terminal then decides on the message to be displayed in accordance with the identified user state. This enables an appropriate message to be displayed corresponding to the user state identified from the degree of interest to be presented.

Third Exemplary Embodiment

Next, a third exemplary embodiment of technology disclosed herein is described. Note that portions that are the same as those of the first and second exemplary embodiment are allocated the same reference numerals and description thereof is omitted.

The third exemplary embodiment differs from the first and second exemplary embodiment in that the current degree of interest is computed in accordance with a degree of interest computed from access history representing viewing history of the content for each user, and from a degree of interest computed based on the scroll operation time and the scrolling speed. Further, the third exemplary embodiment differs from the first and second exemplary embodiment in that messages are decided on at the content server-side.

Figure 13:
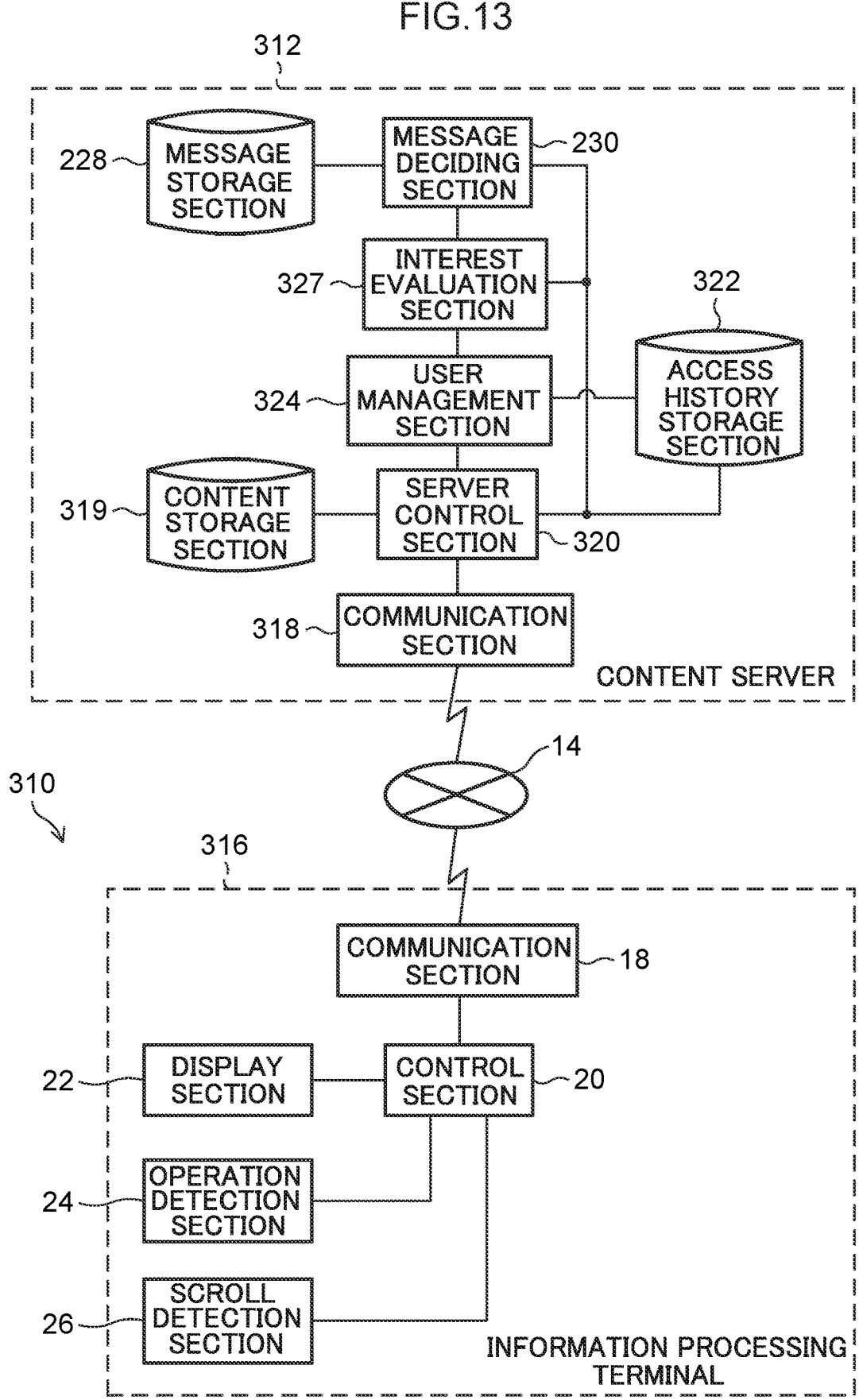
FIG. 13 is a schematic block diagram of an information presentation system according to a third exemplary embodiment.

An information presentation system 310 according to the third exemplary embodiment illustrated in FIG. 13 includes a content server 312 and an information processing terminal 316. The content server 312 and the information processing terminal 316 are, for example, connected to each other via a network 14 such as the Internet.

The information processing terminal 316 includes the communication section 18, the control section 20, the display section 22, the operation detection section 24, and the scroll detection section 26.

As a result of control processing by the control section 20, the communication section 18 of the third exemplary embodiment transmits, to the content server 312, operation information that includes types of input operation, timings of input operations, contact positions, and scroll operation time and non-operation time detected by the operation detection section 24. In the present exemplary embodiment, the scrolling speed detected by the scroll detection section 26 is included in the operation information. Further, the communication section 18 transmits a user ID and a content request signal to the content server 312.

The content server 312 includes a communication section 318, a content storage section 319, a server control section 320, an access history storage section 322, a user management section 324, a degree of interest evaluation section 327, the message storage section 228, and the message deciding section 230.

The communication section 318 exchanges information with the information processing terminal 316. For example, the communication section 318 receives the user ID, the content request signal, and the operation information transmitted from the information processing terminal 316. Further, the communication section 318 transmits the acquired content to the information processing terminal 316 corresponding to the received user ID, in accordance with control by the server control section 320, described later.

The content storage section 319 stores plural items of content. The plural items of content are, for example, stored in the form of a table such as that illustrated in FIG. 14. A content ID, which serves as identifying information of the content, is associated with content in a table 14A illustrated in FIG. 14.

The server control section 320 acquires the user ID, the content request signal, and the operation information received by the communication section 318. The server control section 320 then acquires content stored in the content storage section 319 in accordance with the content request signal received by the communication section 318. More specifically, the server control section 320 acquires, from the content storage section 319, the content corresponding to the content ID included in the request signal. The server control section 320 then controls the communication section 318 so as to transmit the content in accordance with the operation information received by the communication section 318. Further, the server control section 320 stores, in the access history storage section 322, access history, which indicates a user ID, an access timing, and a content ID, received by the communication section 318 when the user views the content, and a degree of interest computed by the degree of interest evaluation section 327, described later.

The access history representing view history of content for each user and the degree of interest computed by the degree of interest evaluation section 227 at that time are stored in the access history storage section 322. The access history of content for each user is, for example, stored in the form of a table such as that illustrated in FIG. 15. The user ID, which serves as identifying information of the user, the content ID, which serves as identifying information of the content, the timing of access to the content, and the degree of interest of the user toward the content are associated with one another in a table 15A illustrated in FIG. 15. For example, the table indicates that the user having the user ID "AA1" viewed the content having the content ID "WWW1" at the timing "yy:mm:dd1:tt1", and the degree of interest computed by the degree of interest evaluation section 227 at that time was "CC1".

Based on the user ID acquired by the server control section 320, the user management section 324 acquires access history corresponding to the target user ID and the degree of interest computed from the access history.

The degree of interest evaluation section 327 computes the degree of interest of the user according to Equation (1), based on the scroll operation time and the scrolling speed of the user acquired by the server control section 320. The degree of interest evaluation section 327 then computes a current degree of interest of the user in accordance with the degree of interest computed based on the scroll operation time and the scrolling speed, and in accordance with the degree of interest acquired by the user management section 324.

For example, the degree of interest evaluation section 327 weights the degree of interest acquired by the user management section 324 in accordance with the access timing and the current timing stored in the access history storage section 322. The value of the weight is, for example, set lower the greater the time difference between the access timing and the current timing, and is set higher the smaller the time difference between the access timing and the current timing.

The degree of interest evaluation section 327 then adds the weighted degree of interest acquired by the user management section 324 to the degree of interest computed based on the scroll operation time and the scrolling speed, and thereby computes the current degree of interest of the user. Computing the current degree of interest in consideration of the past degree of interest of the user enables the degree of interest of the user to be computed with high precision.

Further, the degree of interest evaluation section 327 computes the degree of interest in each unit of time, and computes, as the current change amount of the degree of interest, the difference between the degree of interest computed in the unit of time of the previous timing and the degree of interest computed for the unit of time of the current timing. The degree of interest evaluation section 327 then identifies the user state based on the computed current degree of interest and current change amount of the degree of interest, similarly to in the second exemplary embodiment.

The message deciding section 230 decides on a message to be displayed on the display section 22 of the information processing terminal 316 in accordance with the user state identified by the degree of interest evaluation section 327, similarly to in the second exemplary embodiment.

The server control section 320 acquires the message decided on by the message deciding section 230 and controls the communication section 318 such that the message is transmitted to the information processing terminal 316 of the corresponding user.

The communication section 18 of the information processing terminal 316 receives the message transmitted from the content server 312 and controls the display section 22 such that the message received from the control section 20 is displayed.

Figure 16:
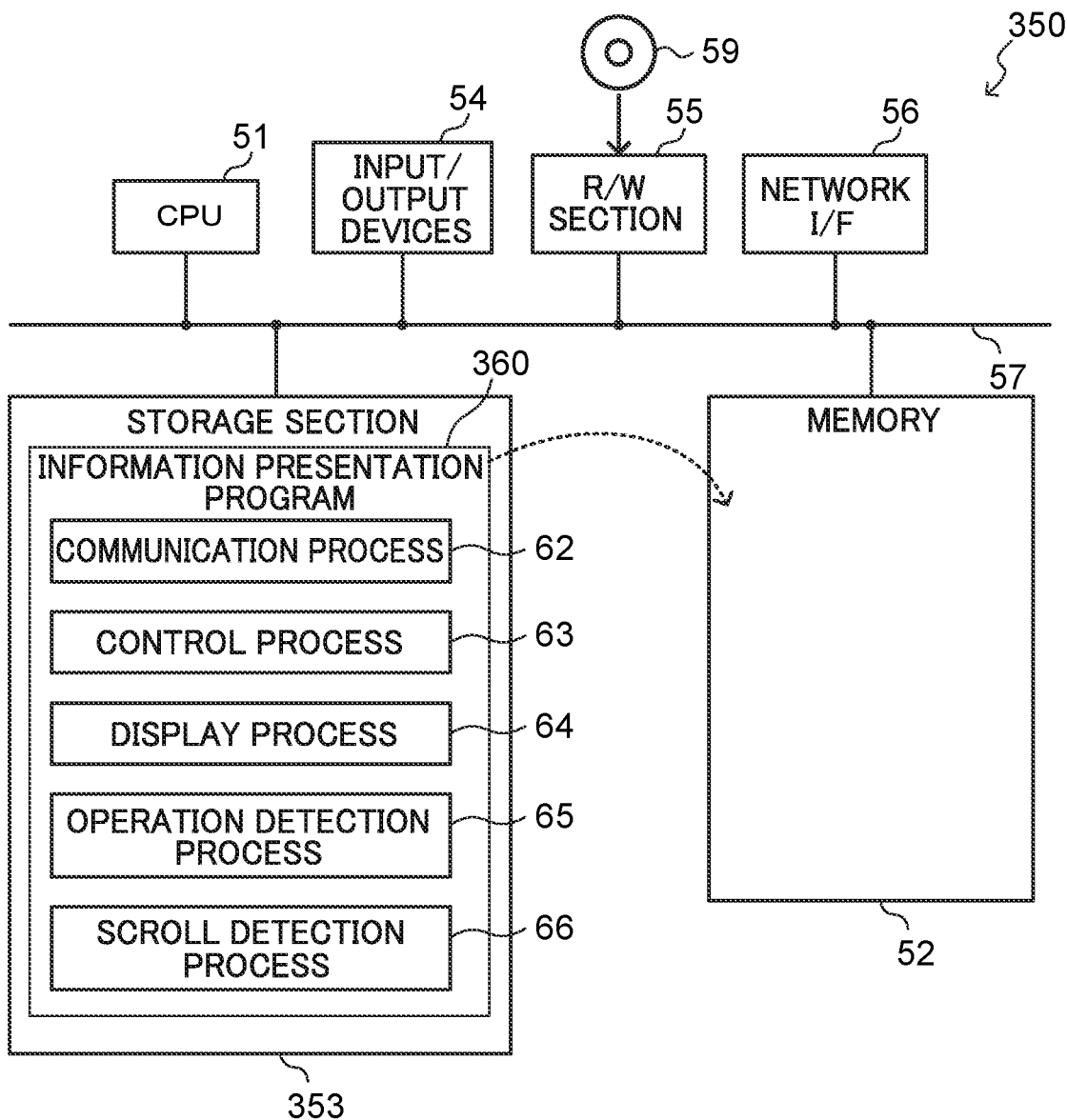
FIG. 16 is a block diagram illustrating a schematic configuration of a computer that functions as an information processing terminal according to the third exemplary embodiment.

The information processing terminal 316 may, for example, be implemented by a computer 350 illustrated in FIG. 16. The computer 350 includes a CPU 51, memory 52 serving as a temporary storage region, and a non-volatile storage section 353. Further, the computer 350 includes input/output devices 54 such as a display device and an input device, and an R/W section 55 that controls reading and writing of data from and to a recording medium 59. Further, the computer 350 includes a network I/F 56 connected to a network such as the Internet. The CPU 51, the memory 52, the storage section 353, the input/output devices 54, the R/W section 55, and the network I/F 56 are connected to one another via a bus 57.

The storage section 353 may be implemented by a HDD, an SSD, flash memory, or the like. An information presentation program 360 for causing the computer 350 to function as the information processing terminal 316 is stored in the storage section 353, which serves as a storage medium. The information presentation program 360 includes the communication process 62, the control process 63, the display process 64, the operation detection process 65, and the scroll detection process 66.

The CPU 51 reads the information presentation program 360 from the storage section 353, expands the information presentation program 360 into the memory 52, and sequentially executes the processes included in the information presentation program 360. The CPU 51 operates as the communication section 18 illustrated in FIG. 13 by executing the communication process 62. Further, the CPU 51 operates as the control section 20 illustrated in FIG. 13 by executing the control process 63. Further, the CPU 51 operates as the display section 22 illustrated in FIG. 13 by executing the display process 64. Further, the CPU 51 operates as the operation detection section 24 illustrated in FIG. 13 by executing the operation detection process 65. Further, the CPU 51 operates as the scroll detection section 26 illustrated in FIG. 13 by executing the scroll detection process 66. Further, the CPU 51 operates as the message deciding section 230 illustrated in FIG. 13 by executing the message deciding process 67. The computer 50, which executes the information presentation program 360, thereby functions as the information processing terminal 316.

Note that the functionality implemented by the information presentation program 360 may, for example, be implemented by a semiconductor integrated circuit, and more specifically, by an ASIC or the like.

Figure 17:
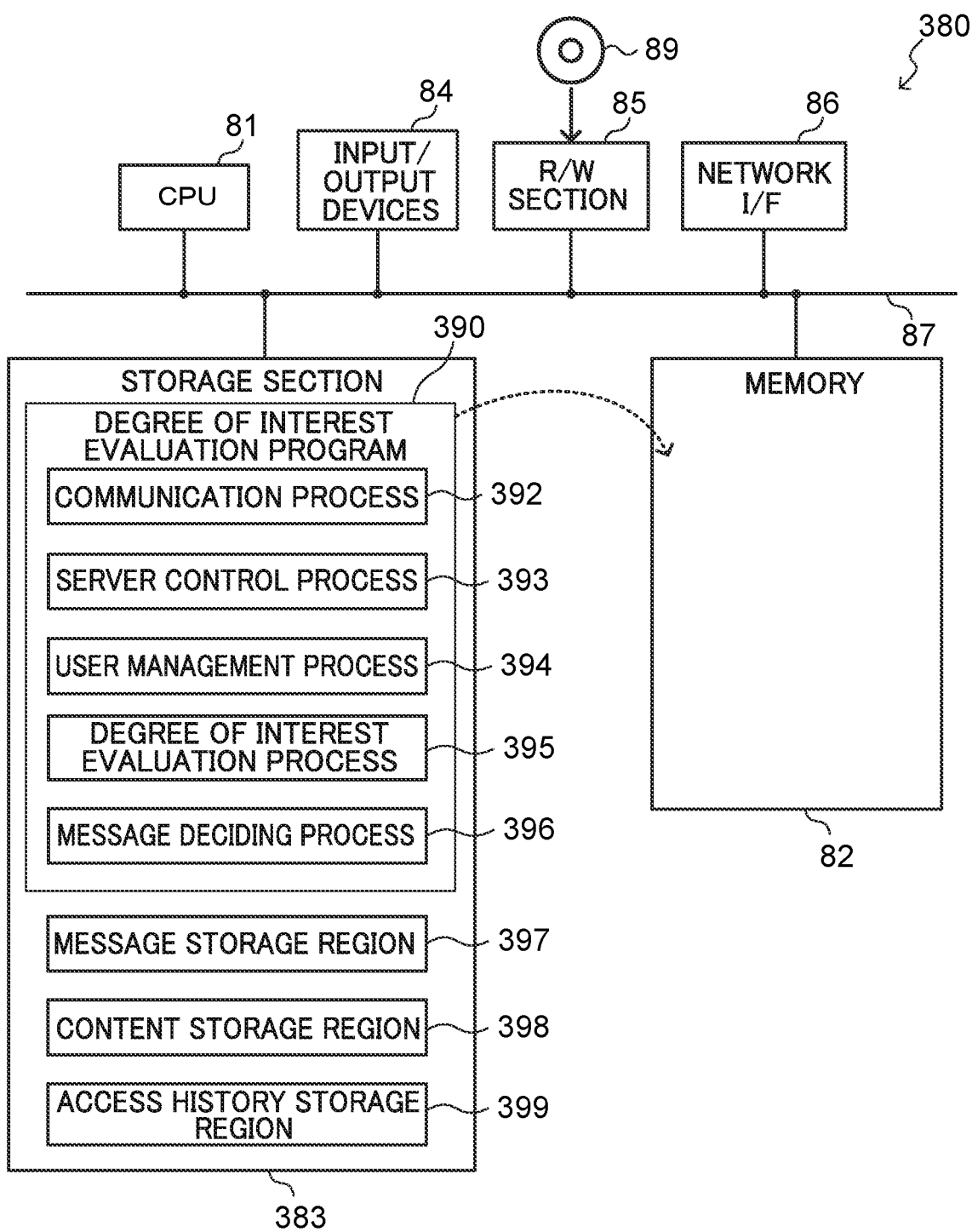
FIG. 17 is a block diagram illustrating a schematic configuration of a computer that functions as a content server according to the third exemplary embodiment.

Further, the content server 312 may, for example, be implemented by a computer 380 illustrated in FIG. 17. The computer 380 includes a CPU 81, memory 82 serving as a temporary storage region, and a non-volatile storage section 383. Further, the computer 380 includes input/output devices 84 such as a display device and an input device, and an R/W section 85 that controls reading and writing of data from and to a recording medium 89. Further, the computer 380 includes a network I/F 86 connected to a network such as the Internet. The CPU 81, the memory 82, the storage section 383, the input/output devices 84, the R/W section 85, and the network I/F 86 are connected to one another via a bus 87.

The storage section 383 may be implemented by a HDD, an SSD, flash memory, or the like. A degree of interest evaluation program 390 for causing the computer 380 to function as the content server 312 is stored in the storage section 383, which serves as a storage medium. The degree of interest evaluation program 390 includes a communication process 392, a server control process 393, a user management process 394, a degree of interest evaluation process 395, and a message deciding process 396. Further, the storage section 383 includes a message storage region 397 that stores information configuring the message storage section 228. Further, the storage section 383 includes a content storage region 398 that stores information configuring the content storage section 319. Further, the storage section 383 includes an access history storage region 399 that stores information configuring the access history storage section 322.

The CPU 51 reads the information presentation program 360 from the storage section 383, expands the information presentation program 360 into the memory 52, and sequentially executes the processes included in the degree of interest evaluation program 390. The CPU 51 operates as the communication section 318 illustrated in FIG. 13 by executing the communication process 392. Further, the CPU 51 operates as the server control section 320 illustrated in FIG. 13 by executing the server control process 393. Further, the CPU 51 operates as the user management section 324 illustrated in FIG. 13 by executing the user management process 394. Further, the CPU 51 operates as the degree of interest evaluation section 327 illustrated in FIG. 13 by executing the degree of interest evaluation process 395. Further, the CPU 51 operates as the message deciding section 230 illustrated in FIG. 13 by executing the message deciding process 396. Further, the CPU 51 reads the information from the message storage region 397 and expands the message storage section 228 into the memory 52. Further, the CPU 51 reads the information from the content storage region 398 and expands the content storage section 319 into the memory 52. Further, the CPU 51 reads the information from the access history storage region 399 and expands the access history storage section 322 into the memory 52. The computer 380, which executes the degree of interest evaluation program 390, thereby functions as the content server 312.

Note that the functionality implemented by the degree of interest evaluation program 390 may, for example, be implemented by a semiconductor integrated circuit, and more specifically, by an ASIC or the like.

Figure 18:
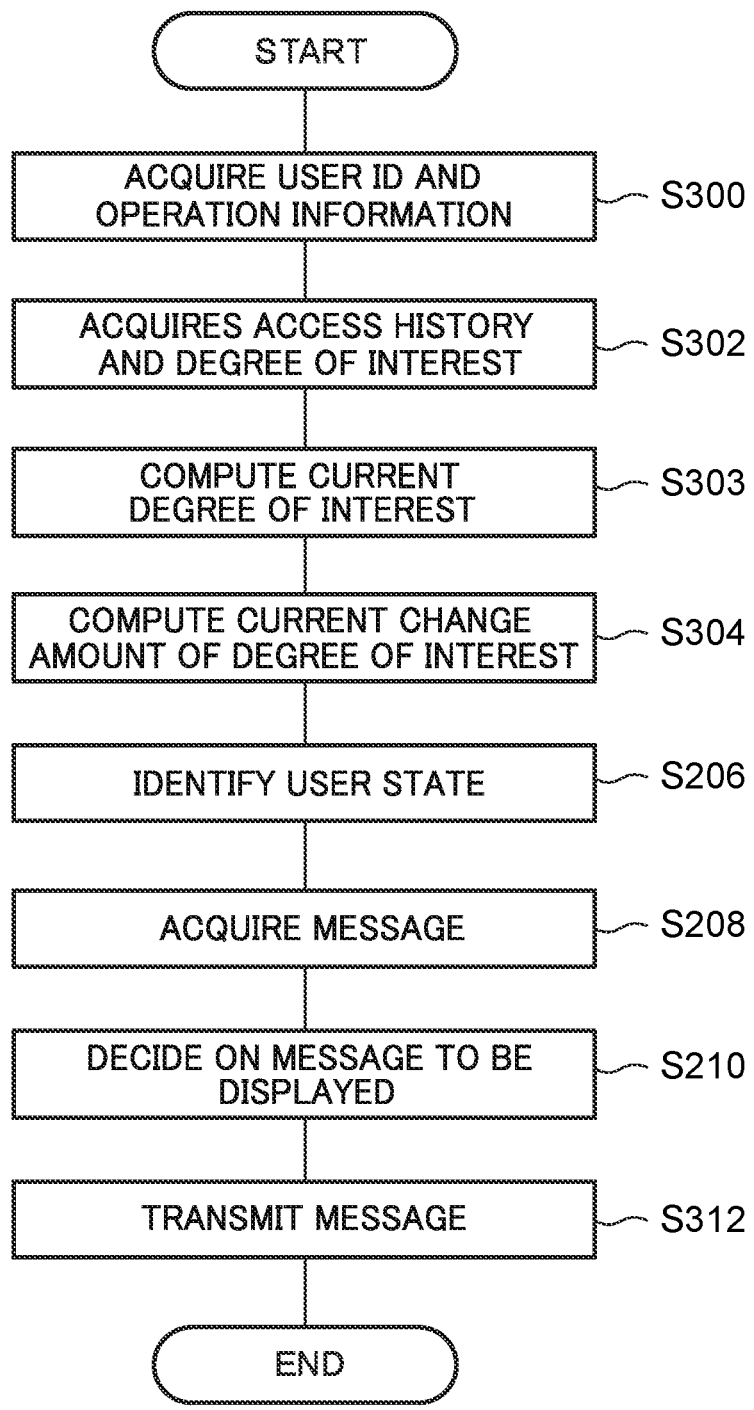
FIG. 18 is a flowchart illustrating an example of degree of interest evaluation processing of the third exemplary embodiment.

Next, operation of the information presentation system 310 according to the third exemplary embodiment is described. In the information presentation system 310, the information processing terminal 316 receives content from the content server 312. Then, the received content is displayed on the display section 22 of the information processing terminal 316, operations are input by the user, and the respective detection processing by the operation detection section 24 and the scroll detection section 26 is performed for each unit of time. The communication section 18 of the information processing terminal 316 then transmits, to the content server 312, the user ID, the operation information by the user, and the content request signal from the control processing by the control section 20, for each unit of time. When the communication section 318 of the content server 312 receives information transmitted from the information processing terminal 316, the content server 312 repeatedly executes the degree of interest evaluation processing illustrated in FIG. 18 for each unit of time. The processing is described in detail below.

At step S300, the server control section 320 acquires the user ID and operation information received by the communication section 318.

At step S302, the user management section 324 acquires the access history corresponding to the target user ID and the degree of interest computed from the access history, based on the user ID acquired at step S300 above.

At step S303, the degree of interest evaluation section 327 computes the degree of interest of the corresponding user according to Equation (1) above, based on the scroll operation time and the scrolling speed included in the operation information acquired at step S300 above. The degree of interest evaluation section 327 then computes the current degree of interest of the user in accordance with the degree of interest computed based on Equation (1) above and the degree of interest acquired at step S302 above.

At step S304, the degree of interest evaluation section 327 computes, as the current change amount of the degree of interest, the difference between the degree of interest computed by the previous degree of interest evaluation processing and the current degree of interest computed at step S303 above.

At step S206 to step S210, the message to be displayed is decided similarly to in the second exemplary embodiment.

At step S312, the server control section 320 acquires the message decided on at step S210 and controls the communication section 318 such that the message is transmitted to the information processing terminal 316 of the corresponding user, and the degree of interest evaluation processing ends.

The communication section 18 of the information processing terminal 316 receives the message transmitted from the content server 312 and controls the display section 22 such that the message received by the control section 20 is displayed.

As described above, the content server according to the third exemplary embodiment acquires access history corresponding to the target user from the access history storage section, which stores access history representing viewing history of content for each user. The content server then computes the current degree of interest in accordance with the degree of interest computed from the access history and the degree of interest computed based on the scroll operation time and the scrolling speed. The content server then identifies the user state based on the current degree of interest and change amount of the degree of interest. The user state can thereby be identified with high precision in accordance with the user access history, enabling an appropriate message can be presented.

Fourth Exemplary Embodiment

Next, a fourth exemplary embodiment of technology disclosed herein is described. Note that portions that are the same as those of the first exemplary embodiment to the third exemplary embodiment are allocated the same reference numerals and description thereof is omitted.

The fourth exemplary embodiment differs from the first exemplary embodiment in that interaction between the user and an operator is started in cases in which the user has made a predetermined response to a message displayed on a display section of an information processing terminal. The present exemplary embodiment describes an example of a case in which the operator is an interaction system implemented by information processing, such as a bot.

In the fourth exemplary embodiment, processing that decides on the message to be displayed in content on the web and processing that performs an interactive exchange by a chat are executed to correspond with the user. More specifically, the message corresponding to the "initial remark" to the user is appropriately changed based on the degree of interest and the change amount of the degree of interest.

Figure 19:
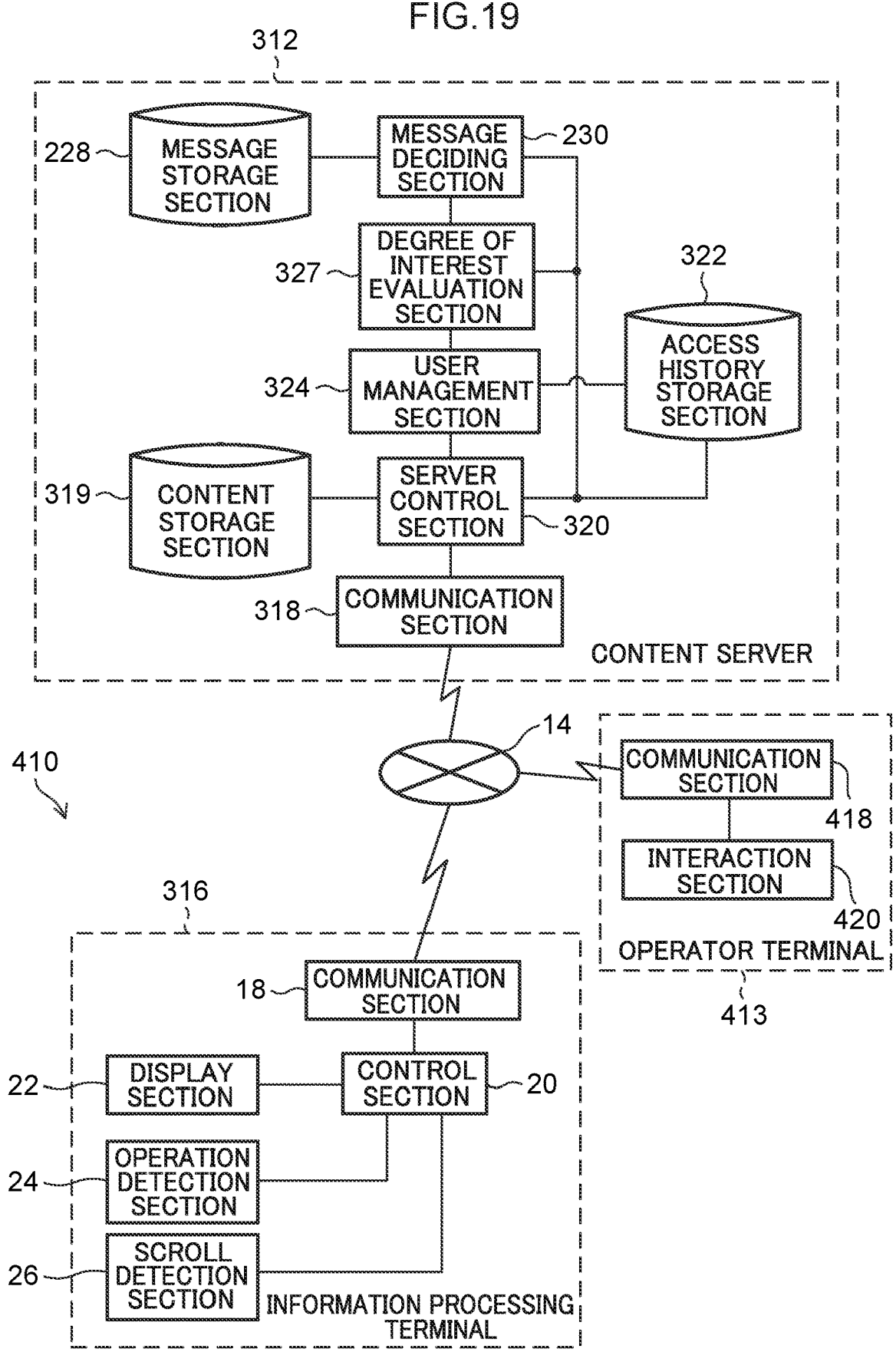
FIG. 19 is a schematic block diagram of an information presentation system according to a fourth exemplary embodiment.

The information presentation system 410 according to the fourth exemplary embodiment illustrated in FIG. 19 includes the content server 312, the information processing terminal 316, and an operator terminal 413. The content server 312, the information processing terminal 316, and the operator terminal 413 are, for example, connected via a network 14 such as the Internet.

The control section 20 of the information processing terminal 316 of the fourth exemplary embodiment acquires a response of the user after the message transmitted from the content server 312 has been displayed on the display section 22 in association with the content. For example, consider an example of a case in which, when a touch operation or the like has been performed on a place where a message is displayed, an icon is displayed, and the icon asks the user for a decision as to whether or not to perform interaction between the operator and the user. In such cases, information regarding whether or not to perform interaction with the operator is acquired by the operation detection section 24 of the information processing terminal 316 as the user response. The control section 20 then controls the communication section 18 such that a request signal for a chat with the content server 312 is transmitted in cases in which the user response indicates "perform interaction with operator".

When a chat request signal is received by the communication section 318, the server control section 320 of the content server 312 of the fourth exemplary embodiment controls the communication section 318 such that the user ID of the information processing terminal 316 that transmitted the chat request signal is transmitted to the operator terminal 413.

The operator terminal 413 includes a communication section 418 and an interaction section 420.

The communication section 418 exchanges information with the content server 312 and the information processing terminal 316. For example, the communication section 418 receives the user ID transmitted from the content server 312. The communication section 418 then specifies the information processing terminal 316 corresponding to the received user ID, and establishes a connection with the specified information processing terminal 316.

The interaction section 420 performs a chat with the information processing terminal 316 with which the communication section 418 established a connection. The interaction section 420 then acquires a user message that is a message input by the user of the information processing terminal 316. The interaction section 420 then acquires a message in response to the user message and controls such that the message is transmitted to the information processing terminal 316 by the communication section 418.

The message in response to the user message may be pre-stored in a storage section (not illustrated) or the interaction section 420 may generate the message in accordance with the user message.

Figure 20:
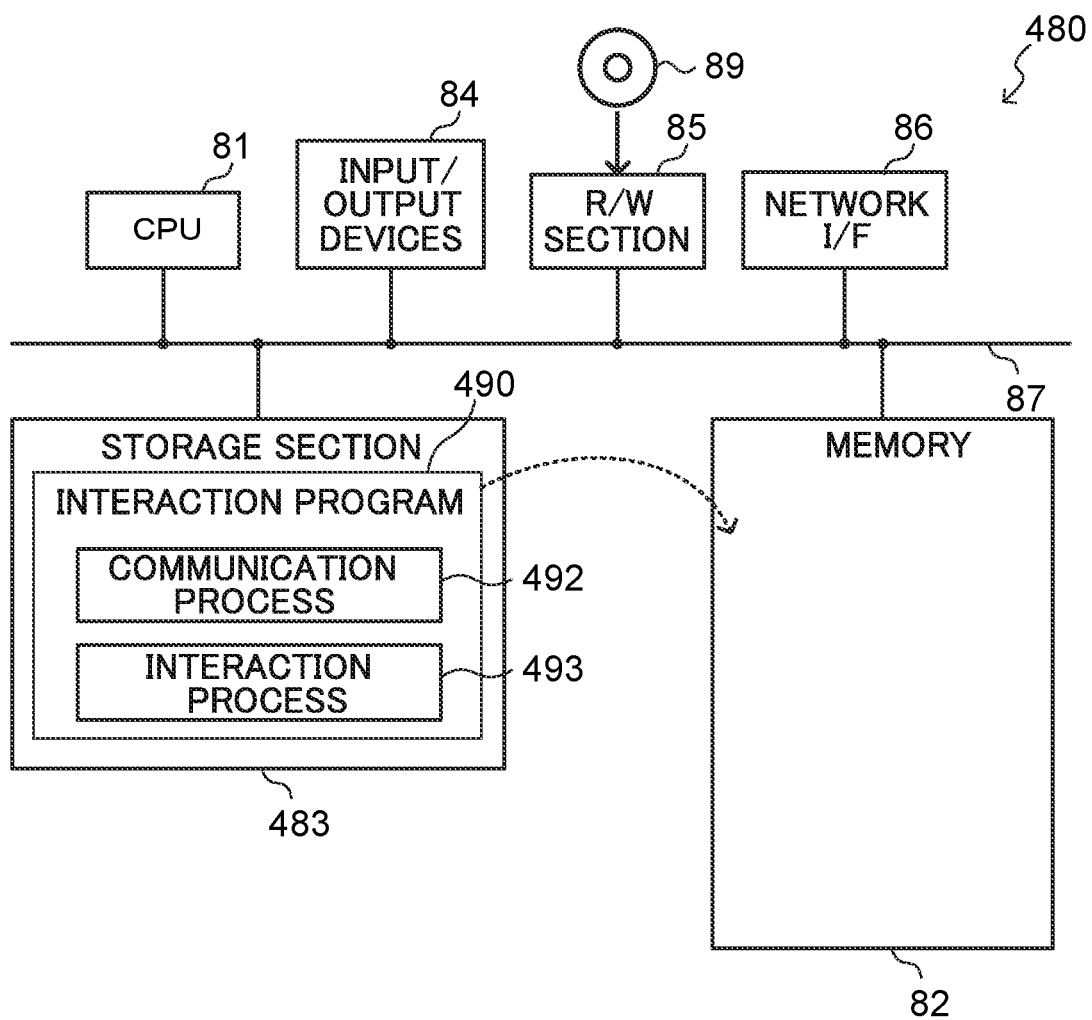
FIG. 20 is a block diagram illustrating a schematic configuration of a computer that functions as an operator terminal according to the fourth exemplary embodiment.

The operator terminal 413 may, for example, be implemented by a computer 480 illustrated in FIG. 20. The computer 480 includes a CPU 81, memory 82 serving as a temporary storage region, and a non-volatile storage section 483. Further, the computer 480 includes input/output devices 84 such as a display device and an input device, and an R/W section 85 that controls reading and writing of data from and to a recording medium 89. Further, the computer 480 includes a network I/F 86 connected to a network such as the Internet. The CPU 81, the memory 82, the storage section 483, the input/output devices 84, the R/W section 85, and the network I/F 86 are connected to one another via a bus 87.

The storage section 483 may, for example, be implemented by a HDD, an SSD, flash memory, or the like. An interaction program 490 for causing the computer 480 to function as the operator terminal 413 is stored in the storage section 483, which serves as a storage medium. The interaction program 490 includes a communication process 492 and an interaction process 493.

The CPU 51 reads the interaction program 490 from the storage section 483, expands the interaction program 490 into the memory 82, and sequentially executes the processes included in the interaction program 490. The CPU 51 operates as the communication section 418 illustrated in FIG. 19 by executing the communication process 492. Further, the CPU 51 operates as the interaction section 420 illustrated in FIG. 19 by executing the interaction process 493.

Note that the functionality implemented by the interaction program 490 may, for example, be implemented by a semiconductor integrated circuit, and more specifically, by an ASIC or the like.

Figure 21:
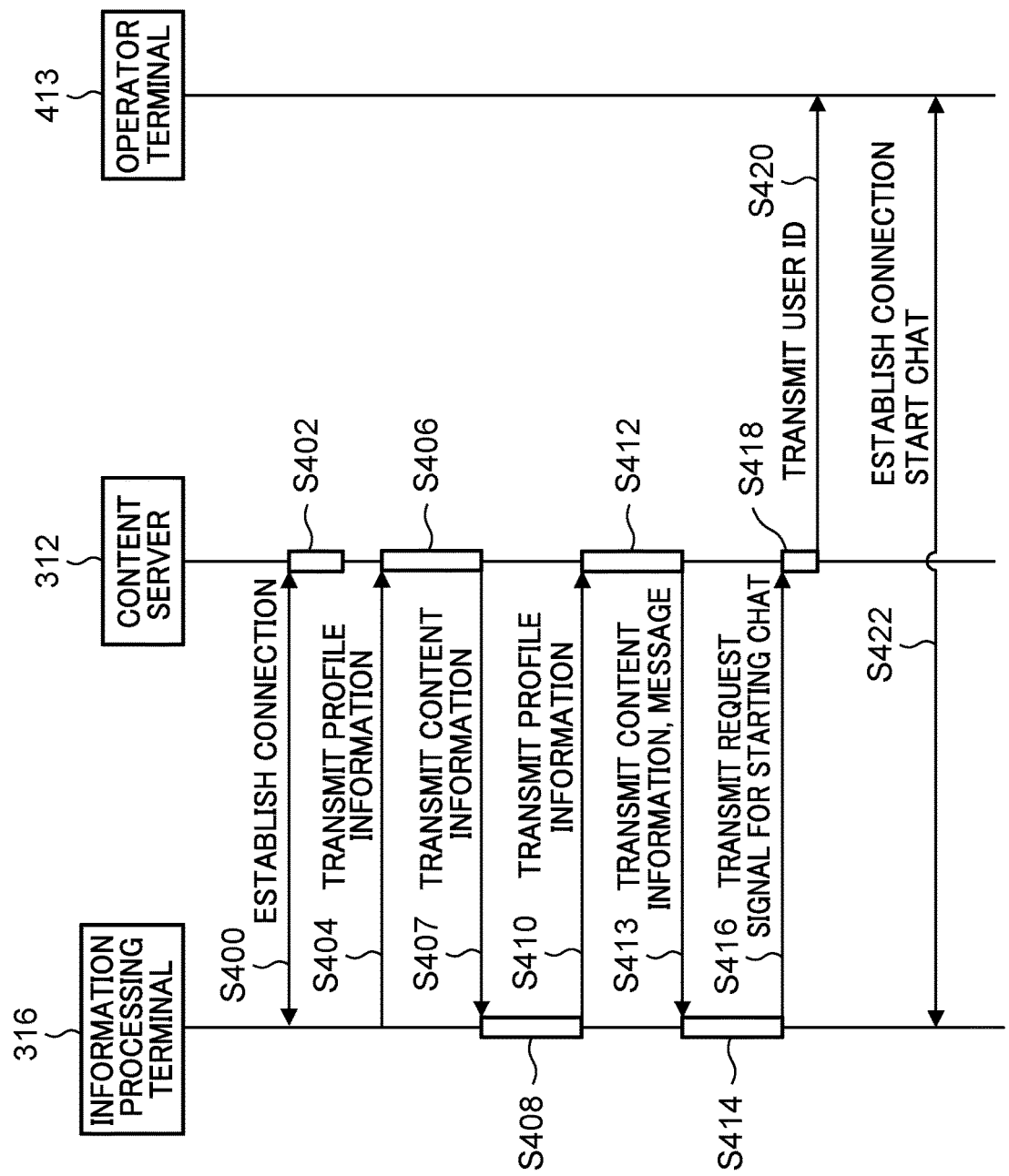
FIG. 21 is a sequence chart illustrating an example of a flow of an interaction processing sequence.

Next, operation of the information presentation system 410 according to the fourth exemplary embodiment is described. In the information presentation system 410, when the information processing terminal 316 receives an input operation by the user and transmits the user ID to the content server 312, the content server 312 executes the processing illustrated in FIG. 18, similarly to in the third exemplary embodiment. Further, the content server 312 transmits the user ID to the operator terminal 413 for the chat processing between the information processing terminal 316 and the operator terminal 413. A chat between the information processing terminal 316 and the operator terminal 413 then starts. Operation of the information presentation system 410 is described with reference to FIG. 21. FIG. 21 is a sequence chart illustrating an example of exchange of information between each of the devices.

At step S400, the communication section 318 of the content server 312 receives the user ID transmitted by the information processing terminal 316. The content server 312 then establishes a connection with the information processing terminal 316 corresponding to the received user ID.

At step S402, the user management section 324 of the content server 312 acquires, from the access history storage section 322, the access history corresponding to the user ID received at step S400 above, and the degree of interest computed from the access history.

At step S404, for each unit of time, the communication section 18 of the information processing terminal 316 transmits, to the content server 312 as profile information, operation information detected by operation detection section 24 and the scroll detection section 26 for each unit of time and a content request signal.

At step S406, the communication section 318 of the content server 312 receives, as profile information for each unit of time, the operation information transmitted by the information processing terminal 316. Then, according to the profile information, the server control section 320 of the content server 312 acquires the content stored in the content storage section 319.

At step S407, the server control section 320 of the content server 312 controls the communication section 318 such that the acquired content is transmitted to the information processing terminal 316.

At step S408, for each unit of time, the communication section 18 of the information processing terminal 316 receives the content transmitted from the content server 312. The control section 20 of the information processing terminal 316 then controls the display section 22 such that the content is displayed.

At step S410, the communication section 18 of the information processing terminal 316 again transmits, to the content server 312 as the profile information, the operation information detected by the operation detection section 24 and the scroll detection section 26, after the content has been displayed at step S408 above. The processing of step S410 is repeated for each unit of time.

At step S412, the communication section 318 of the content server 312 receives the profile information transmitted from the information processing terminal 316 for each unit of time. The server control section 320 of the content server 312 then acquires the content stored in the content storage section 319 according to the profile information. For example, the server control section 320 acquires the content that is to be displayed from the content storage section 319 in accordance with a scroll operation included in the operation information.

Further, at step S412, the degree of interest evaluation section 327 of the content server 312 computes the current degree of interest for each unit of time based on the degree of interest in the past acquired at step S402 above, and the degree of interest computed from the operation information included in the profile information for each unit of time. Here, a case is described in which the user state is identified from the computed current degree of interest and the current change amount of the degree of interest, at the current step, S412. The message deciding section 230 decides on the message to be displayed on the display section 22 of the information processing terminal 316 in accordance with the user state identified by the degree of interest evaluation section 327.

At step S413, the server control section 320 of the content server 312 acquires the message decided on at step S412 above. Further, at step S413, the server control section 320 of the content server 312 controls the communication section 318 such that the content associated with the message is transmitted to the information processing terminal 316.

At step S414, the communication section 18 of the information processing terminal 316 acquires the content and the message transmitted at step S413 above. The control section 20 of the information processing terminal 316 acquires the user response after the acquired message has been displayed on the display section 22 in association with the content.

At step S416, in cases in which the user response acquired at step S414 above is a desire for interaction with the operator, the control section 20 controls the communication section 18 such that the chat request signal is transmitted to the content server 312.

At step S418, the communication section 318 of the information processing terminal 316 receives the chat request signal transmitted at step S416 above. Then, at step S420, the server control section 320 of the information processing terminal 316 controls the communication section 318 such that the user ID of the information processing terminal 316 that transmitted the chat request signal is transmitted to the operator terminal 413.

At step S422, the communication section 418 of the operator terminal 413 establishes a connection with the information processing terminal 316 corresponding to the received user ID and the interaction section 420 starts a chat with the information processing terminal 316.

As described above, the operator terminal according to the fourth exemplary embodiment acquires the user message input by the user after the message decided on by the degree of interest evaluation program of the content server 312 has been displayed to the user in association with the content. The operator terminal then acquires a message corresponding to the user message and outputs the message. This enables appropriate services to be provided by starting interaction with the user after a message corresponding to the user state has been presented.

Fifth Exemplary Embodiment

Next, a fifth exemplary embodiment of technology disclosed herein is described. Note that portions that are the same as those of the first exemplary embodiment to the fourth exemplary embodiment are allocated the same reference numerals and description thereof is omitted.

In the fifth exemplary embodiment, the state of the user operating the information processing terminal is estimated by the operator terminal. The operator then operates the operator terminal and makes a remark to the user in accordance with the user state, such that the present exemplary embodiment differs from the first exemplary embodiment to the fourth exemplary embodiment. In the present exemplary embodiment, an example is described in which the operator is a person.

Figure 22:
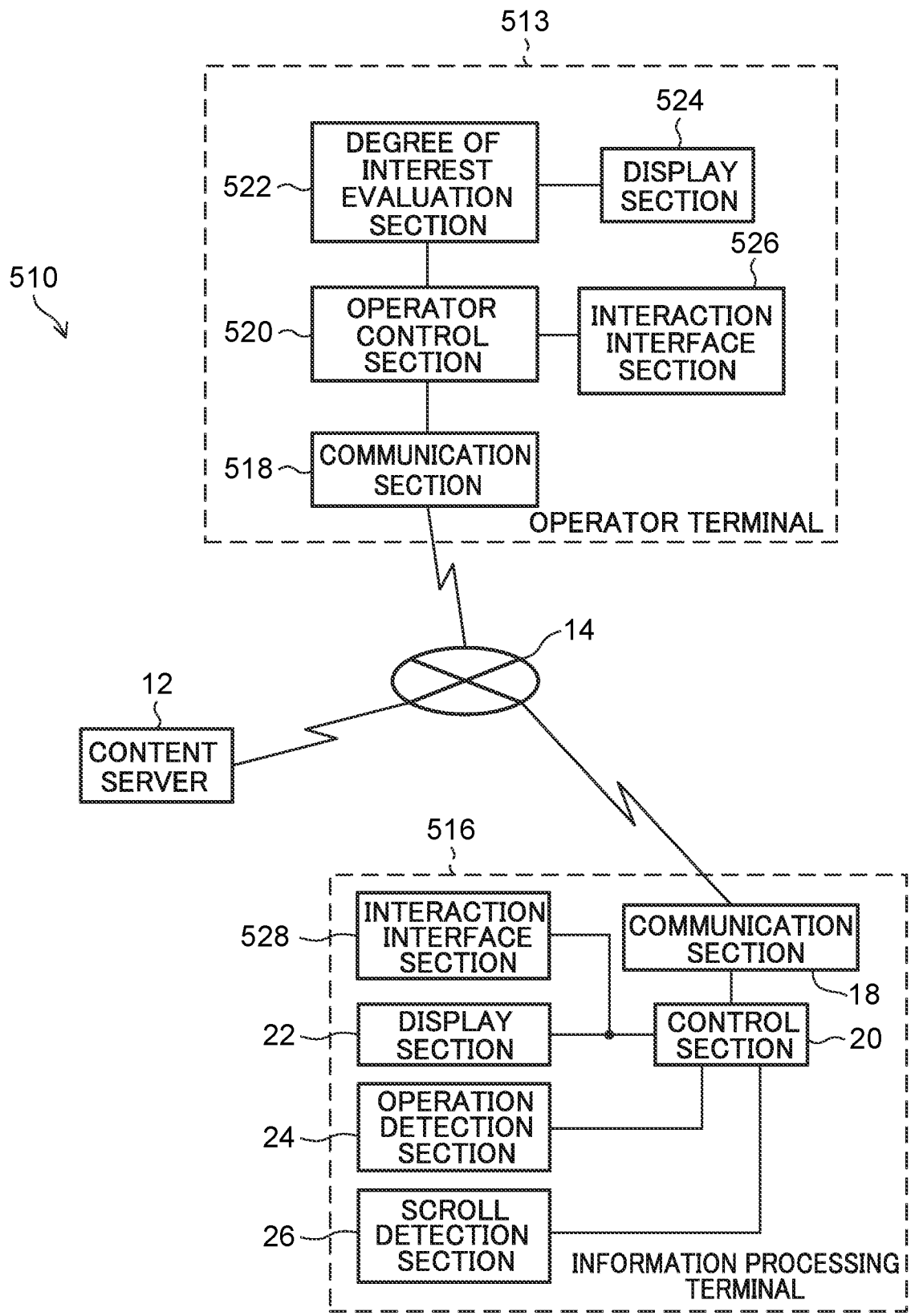
FIG. 22 is a schematic block diagram of an information presentation system according to a fifth exemplary embodiment.

An information presentation system 510 according to the fifth exemplary embodiment illustrated in FIG. 22 includes the content server 12, an operator terminal 513, and an information processing terminal 516. The content server 12, the operator terminal 513, and the information processing terminal 516 are, for example, connected to one another via a network 14 such as the Internet.

The information processing terminal 516 includes the communication section 18, the control section 20, the display section 22, the operation detection section 24, the scroll detection section 26, and an interaction interface section 528.

As a result of control processing by the control section 20, the communication section 18 of the information processing terminal 516 of the fifth exemplary embodiment transmits, to the operator terminal 513, operation information that includes types of input operation, timings of the input operations, contact positions, operation times for each operation, and non-operation time detected by the operation detection section 24. In the present exemplary embodiment, a scrolling speed detected by the scroll detection section 26 is also included in the operation information. Further, the communication section 18 transmits the user ID and a content request signal to the operator terminal 513.

An interaction interface section 526 presents, to the user, interaction information transmitted from the operator terminal 513, described later. Interaction processing with the operator terminal 513 is described later.

The operator terminal 513 includes a communication section 518, an operator control section 520, a degree of interest evaluation section 522, a display section 524, and the interaction interface section 526.

The communication section 518 exchanges information with the information processing terminal 516. For example, the communication section 518 receives the user ID, the content request signal, and the operation information transmitted from the information processing terminal 516.

The operator control section 520 acquires the user ID, the content request signal, and the operation information received by the communication section 518.

The degree of interest evaluation section 522 computes the user degree of interest according to Equation (1) above, based on the scroll operation time and the scrolling speed of the user acquired by the operator control section 520. Note that the current degree of interest of the user may be computed based on access history for each user, similarly to the in the third exemplary embodiment.

Further, the degree of interest evaluation section 522 computes the degree of interest for each unit of time, and computes the difference between the degree of interest computed using the unit of time of the previous timing and the degree of interest computed using the unit of time of the current timing as the change amount of the degree of interest. The degree of interest evaluation section 522 then identifies the user state based on the computed current degree of interest and the current change amount of the degree of interest, similarly to in the second exemplary embodiment.

The display section 524 displays the user state identified by the degree of interest evaluation section 522 in association with a product, which is an example of an item specified from the user ID and the user operation information.

In the fifth exemplary embodiment, the "first state" of the second exemplary embodiment is, for example, set as an "indecisive" state. Further, the "second state" of the second exemplary embodiment is set as a "troubled" state. The "third state" of the second exemplary embodiment is set as an "interestedness" state. The "fourth state" of the second exemplary embodiment is set as a "disinterested" state.

Then, as illustrated in FIG. 23, the display section 524 displays the user state identified by the degree of interest evaluation section 522 in association with a product specified by the user ID and the user operation information. In the example illustrated in FIG. 23, it is apparent that a user having user ID "User058" is in an "indecisive" state with regards to a product group A. Further, it is apparent that a user having user ID "User107" is in an "interestedness" state with regards to a product b. Further, it is apparent that a user having user ID "User061" is in a "troubled" state and a user having user ID "User083" is in a "disinterested" state.

The interaction interface section 526 receives interaction information from the operator operating the operator terminal. The operator successively checks the user states displayed on the display section 524 and makes remarks to the users in accordance with the user states.

For example, in the example illustrated in FIG. 23, it is apparent that a user having user ID "User058" is in an "indecisive" state with regards to the product group A. The operator accordingly makes a remark to the user stating, for example, "allow me to describe product group A" via the information processing terminal having user ID "User058". Note that the interaction information of the remark may be audio information or may be text information in, for example, a chat format.

The operator control section 520 controls the communication section 518 such that the interaction information received by the interaction interface section 526 is transmitted to the information processing terminal 516 having the corresponding user ID.

The communication section 18 of the information processing terminal 516 receives the interaction information transmitted from the operator terminal 513. The control section 20 of the information processing terminal 516 controls such that the interaction information received by the communication section 18 is presented using the interaction interface section 528.

The interaction interface section 528 presents the interaction information to the user and starts interaction between the user and the operator. The user can thus start interaction with the operator in accordance with the state of the user themselves.

Figure 24:
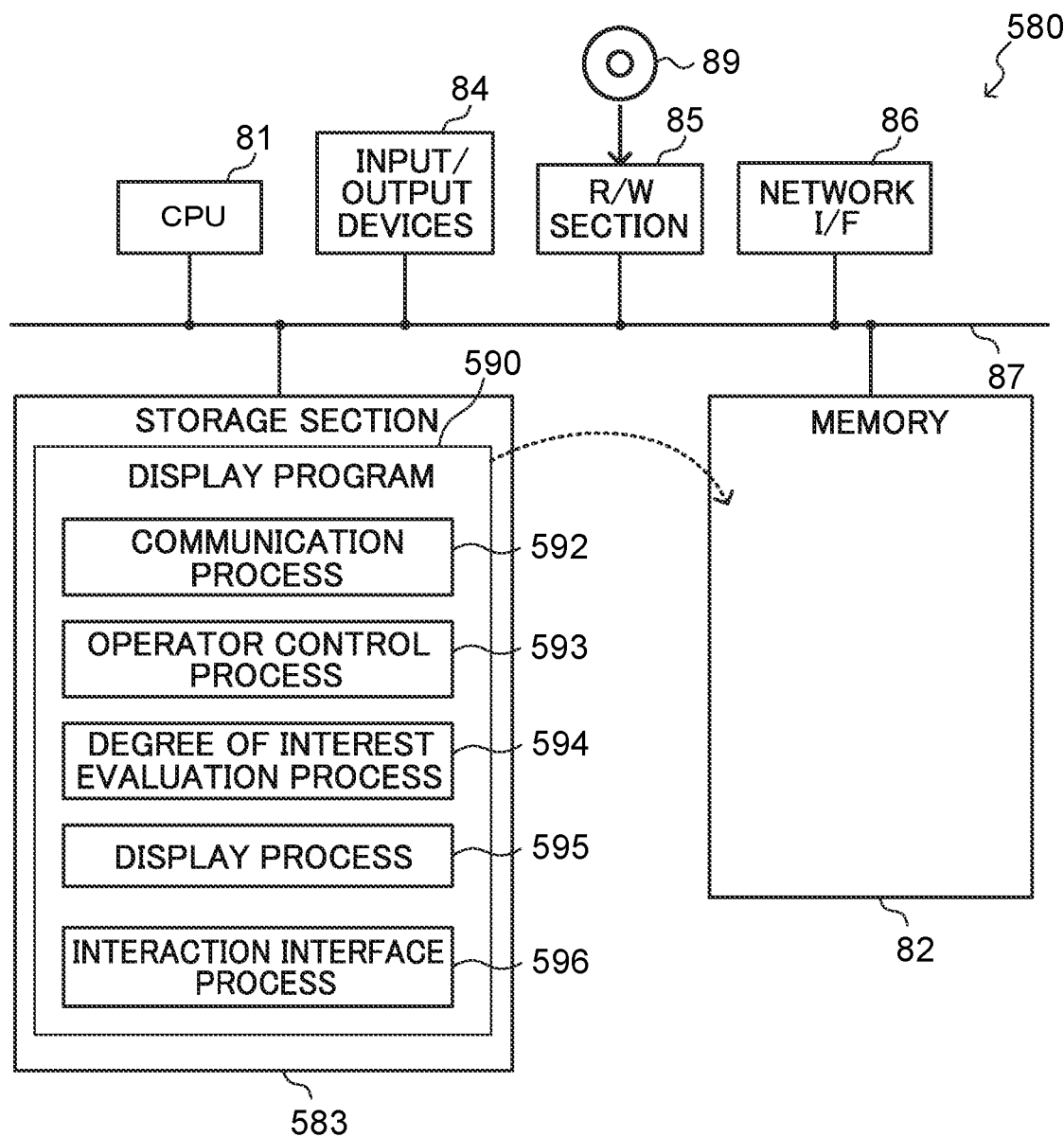
FIG. 24 is a block diagram illustrating a schematic configuration of a computer that functions as an operator terminal according to the fifth exemplary embodiment.

Further, the operator terminal 513 may, for example, be implemented by a computer 580 illustrated in FIG. 24. The computer 580 includes a CPU 81, memory 82 serving as a temporary storage region, and a non-volatile storage section 583. Further, the computer 580 includes input/output devices 84 such as a display device and an input device and an R/W section 85 that controls reading and writing of data from and to a recording medium 89. Further, the computer 580 includes a network I/F 86 connected to a network such as the Internet. The CPU 81, the memory 82, the storage section 583, the input/output devices 84, the R/W section 85, and the network I/F 86 are connected via a bus 87.

The storage section 583 may be implemented by a HDD, an SSD, flash memory, or the like. A display program 590 for causing the computer 580 to function as the operator terminal 513 is stored in storage section 583, which serves as a storage medium. The display program 590 includes a communication process 592, an operator control process 593, a degree of interest evaluation process 594, a display process 595, and an interaction interface process 596.

The CPU 51 reads the display program 590 from the storage section 583, expands the display program 590 into the memory 52, and sequentially executes the processes included in the display program 590. The CPU 51 operates as the communication section 518 illustrated in FIG. 22 by executing the communication process 592. Further, the CPU 51 operates as the operator control section 520 illustrated in FIG. 22 by executing the operator control process 593. Further, the CPU 51 operates as the degree of interest evaluation section 522 illustrated in FIG. 22 by executing the degree of interest evaluation process 594. Further, the CPU 51 operates as the display section 524 illustrated in FIG. 22 by executing the display process 595. Further, the CPU 51 operates as the interaction interface section 526 illustrated in FIG. 22 by executing the interaction interface process 596. The computer 580, which executes the display program 590, thereby functions as the operator terminal 513.

Note that the functionality implemented by the display program 590 may, for example, be implemented by a semiconductor integrated circuit, and more specifically, by an ASIC or the like.

The information processing terminal 516 may, for example, be implemented by a configuration similar to that of the computer 350 illustrated in FIG. 16, mentioned above. Note that an information presentation program for causing the computer 350 to function as the information processing terminal 516 is stored in the storage section 353 of FIG. 16 mentioned above. The information presentation program includes the communication process 62, the control process 63, the display process 64, the operation detection process 65, the scroll detection process 66, and an interaction interface process. The CPU 51 operates as the interaction interface section 528 illustrated in FIG. 22 by executing the interaction interface process.

Figure 25:
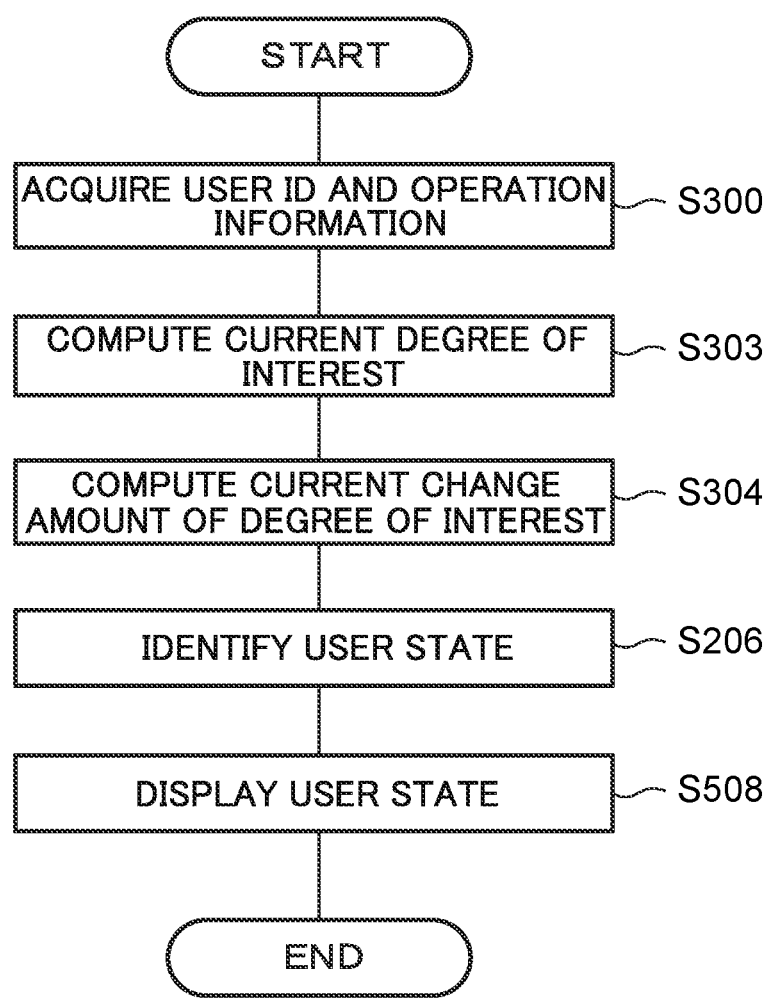
FIG. 25 is a flowchart illustrating an example of information presentation processing according to the fifth exemplary embodiment.

Next, operation of the information presentation system 510 according to the fifth exemplary embodiment is described. In the information presentation system 510, when information processing terminal 516 receives an input operation by the user and transmits the user ID and the operation information to the operator terminal 513, the operator terminal 513 repeatedly executes the display processing illustrated in FIG. 25 for each unit of time.

The processing of step S300 to step S206 is executed similarly to the processing in the second and third exemplary embodiments.

At step S508, the display section 524 displays the user state identified at step S206 in association with the product specified from the user ID and the user operation information, and the display processing ends.

The operator operating the operator terminal 513 then starts appropriate interaction with the information processing terminal 516 operated by the user in accordance with the user state displayed by the display section 524.

As described above, the operator terminal according to the fifth exemplary embodiment displays the user state identified on the basis of the degree of interest in association with the product specified from the user ID and the user operation. The operator then performs interaction in accordance with the user state. This enables the user to start interaction with the operator in accordance with the state of the user themselves, and enables appropriate customer services to be provided.

Sixth Exemplary Embodiment

Next, a sixth exemplary embodiment of technology disclosed herein is described. Note that portions that are the same as those of the first exemplary embodiment to the fifth exemplary embodiment are allocated the same reference numerals and description thereof is omitted.

The sixth exemplary embodiment differs from the first exemplary embodiment to the fifth exemplary embodiment in that an icon is displayed instead of presenting a message corresponding to the user state.

Figure 26:
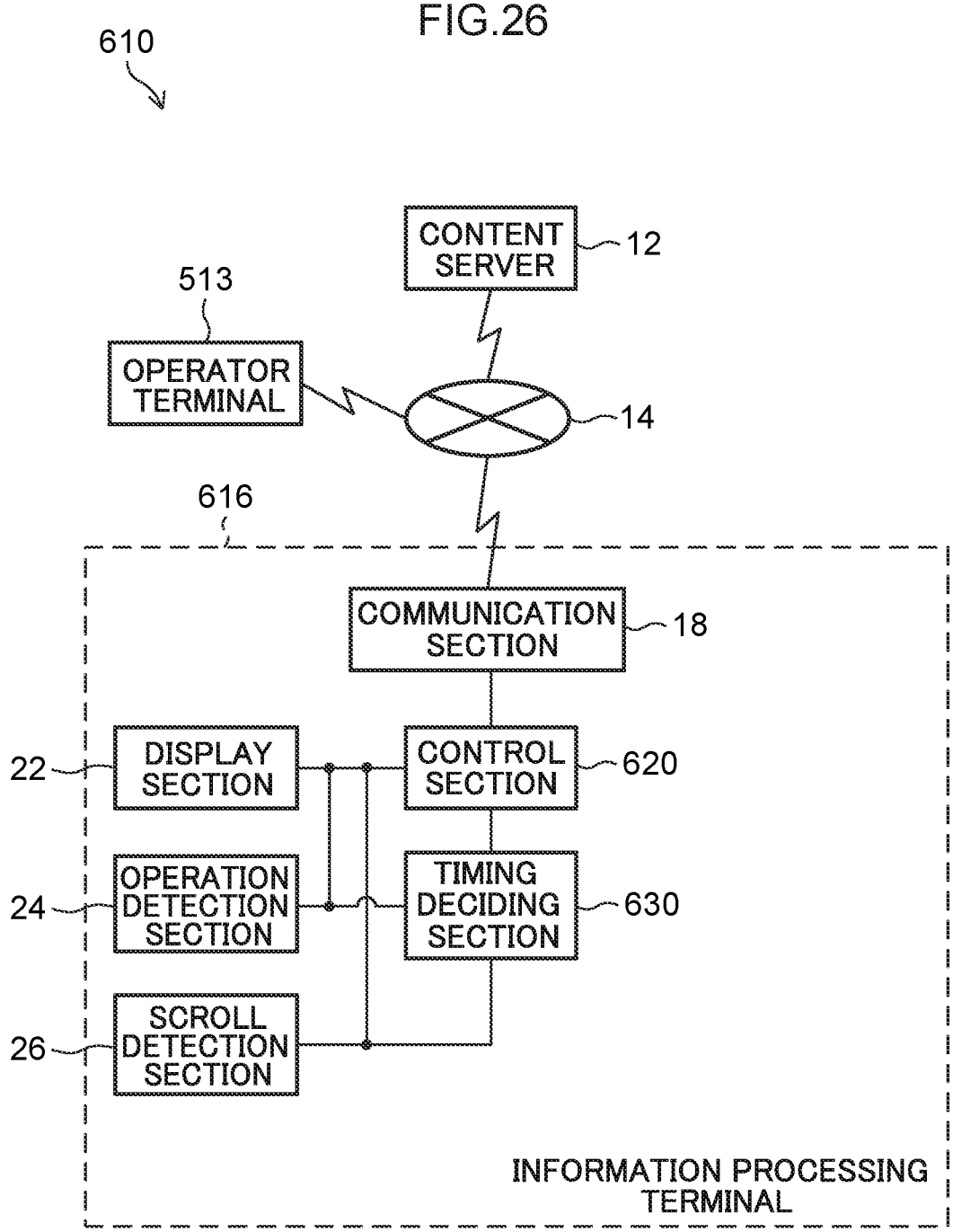
FIG. 26 is a schematic block diagram of an information presentation system according to a sixth exemplary embodiment.

The information presentation system 610 according to the sixth exemplary embodiment illustrated in FIG. 26 includes the content server 12, the operator terminal 513, and an information processing terminal 616. The content server 12, the operator terminal 513, and the information processing terminal 616 are, for example, connected via a network 14 such as the Internet.

The information processing terminal 616 includes the communication section 18, a control section 620, the display section 22, the operation detection section 24, the scroll detection section 26, and a timing deciding section 630.

The timing deciding section 630 decides on a timing for display of the icon in accordance with a scrolling speed measured by the scroll detection section 26. More specifically, the timing deciding section 630 decides on the timing such that an icon for receiving user operations is displayed in cases in which the scrolling speed is less than a pre-set threshold value.

The control section 620 controls such that the icon is displayed on display section 22 in accordance with the timing decided on by the timing deciding section 630.

Figure 27:
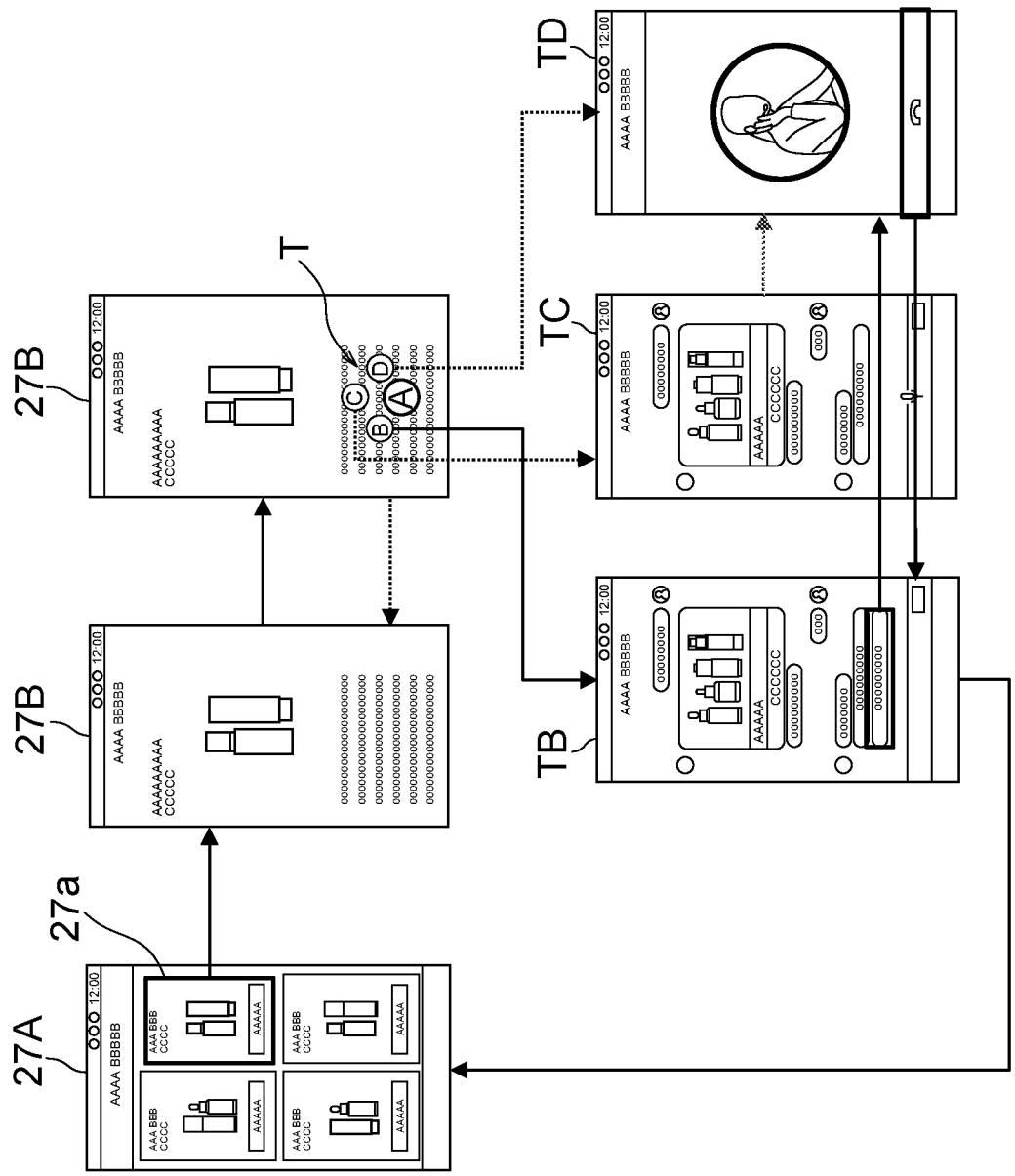
FIG. 27 is an explanatory diagram for explaining an example of an icon displayed in the sixth exemplary embodiment.
Figure 28:
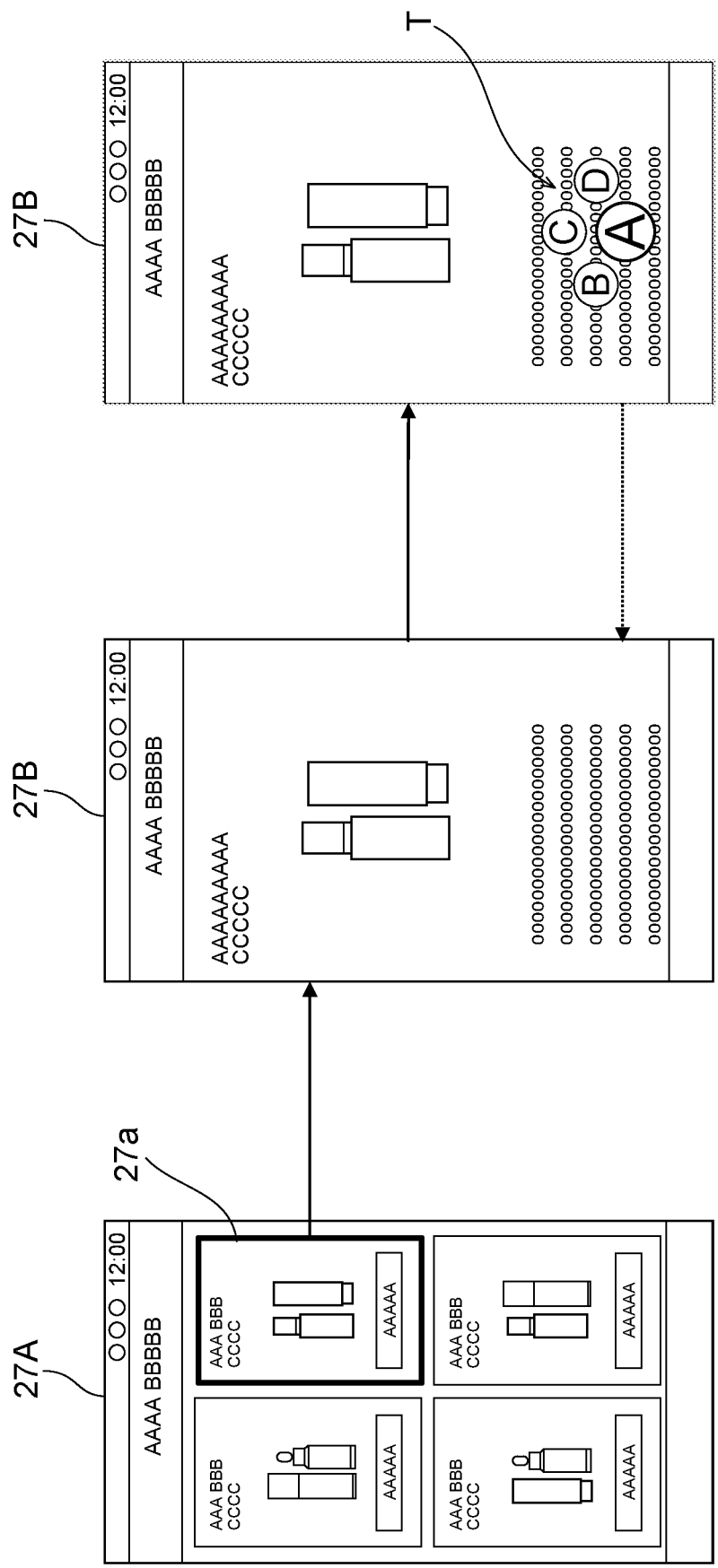
FIG. 28 is an explanatory diagram for explaining an example of an icon displayed in the sixth exemplary embodiment.

Illustrative diagrams of the processing of the sixth exemplary embodiment is described with reference to FIG. 27 and FIG. 28. Consider a case in which content 27a included in the content 27A, illustrated in FIG. 27, has been selected by the user while the content 27A is displayed on the display section 22 of the information processing terminal 616. In this case, content 27B, which is the specific details of the content 27a, is displayed. Then, an icon T for receiving user input is displayed when the scrolling speed is less than the threshold value while the content 27B is displayed.

The user checks the icon T being displayed and selects an operation button in accordance with the service that the user wises to receive. For example, display of the icon T is removed by touching an operation button A in cases in which there are no services that the user particularly wishes to receive. Further, in cases in which the user, for example, desires to receive a description of the product displayed in the content 27B in the form of a text chat, a text chat screen TB is displayed by touching an operation button B and a text chat between the user and the operator is started. Further, in cases in which the user, for example, desires to receive a description of the product displayed in the content 27B in the form of a voice chat, a voice chat screen TC is displayed by touching an operation button C and a voice chat between the user and the operator is started. Further, in cases in which the user, for example, desires to receive a description of the product displayed in the content 27B by a video chat from the human operator, an operation button D is touched. Then, a video chat screen TD with the operator operating the operator terminal 513 is displayed and a video chat between the user and the operator is started.

Further, transition from the text chat screen TB to the video chat screen TD is possible, and transition from the voice chat screen TC to the video chat screen TD is also possible. Further, after the video chat has ended, transition may be made to the text chat screen TB or the voice chat screen TC.

Then, when the user has, for example, purchased the product and each chat has ended, the screen of the content 27A is returned to. Further, configuration may be made such that control is performed to display the content 27B as illustrated in FIG. 28, for example, and display of the icon T is removed when a predetermined time has elapsed after display of the icon T.

Figure 29:
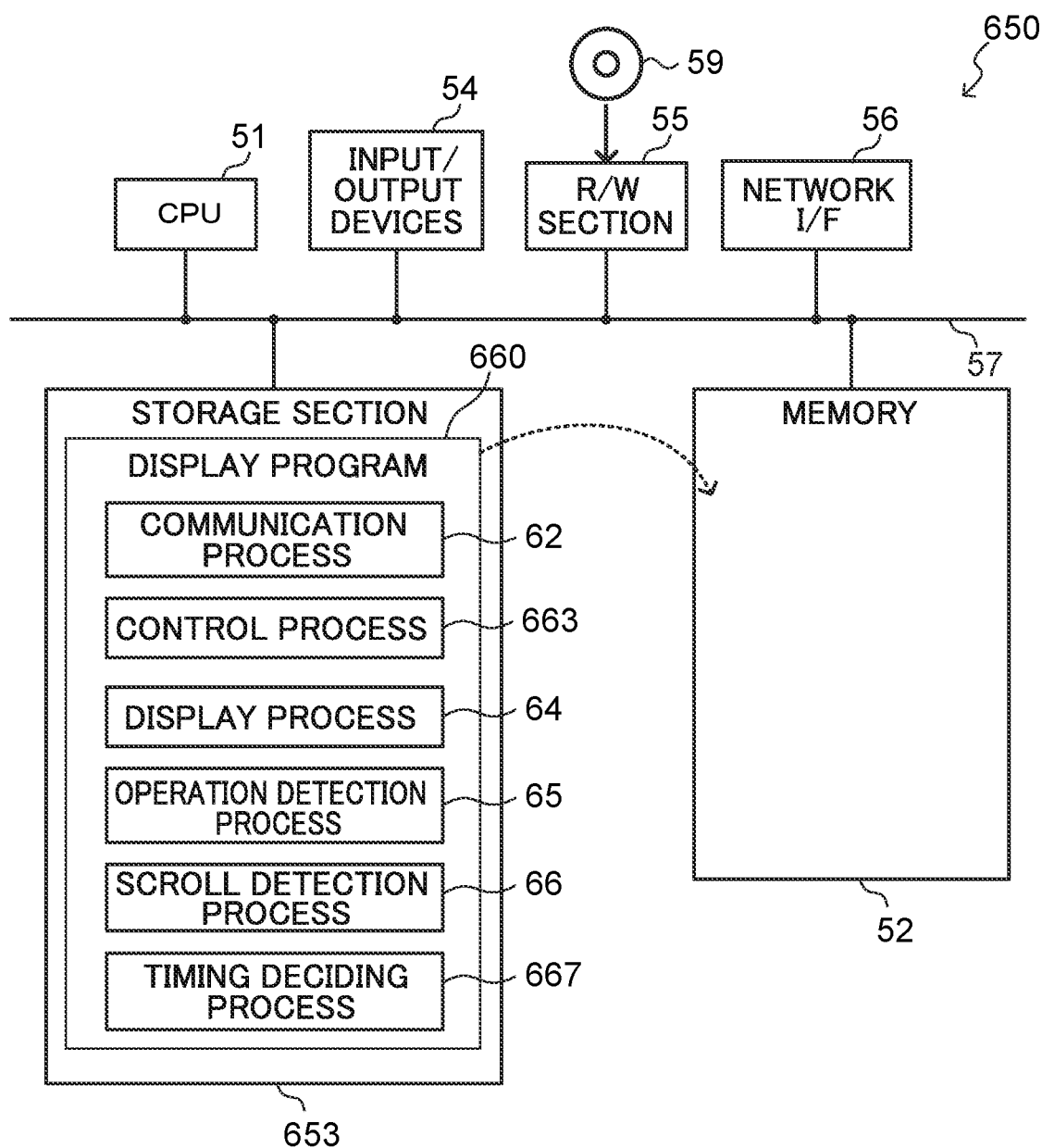
FIG. 29 is a block diagram illustrating a schematic configuration of a computer that functions as an information processing terminal according to the sixth exemplary embodiment.

The information processing terminal 16 may, for example, be implemented by a computer 650 illustrated in FIG. 29. The computer 650 includes a CPU 51, memory 52 serving as a temporary storage region, and a non-volatile storage section 653. Further, the computer 650 includes input/output devices 54 such as a display device and an input device, and an R/W section 55 that controls reading and writing of data from and to a recording medium 59. Further, the computer 650 includes a network I/F 56 connected to a network such as the Internet. The CPU 51, the memory 52, the storage section 653, the input/output devices 54, the R/W section 55, and the network I/F 56 are connected to one another via a bus 57.

The storage section 653 may be implemented by a HDD, an SSD, flash memory, or the like. A display program 660 for causing the computer 650 to function as the information processing terminal 616 is stored in the storage section 653, which serves as a storage medium. The display program 660 includes the communication process 62, a control process 663, the display process 64, the operation detection process 65, the scroll detection process 66, and a timing deciding process 667.

The CPU 51 reads the display program 660 from the storage section 653, expands the display program 660 into the memory 52, and sequentially executes the processes included in the display program 660. The CPU 51 operates as the communication section 18 illustrated in FIG. 26 by executing the communication process 62. Further, the CPU 51 operates as the control section 620 illustrated in FIG. 26 by executing the control process 663. Further, the CPU 51 operates as the display section 22 illustrated in FIG. 26 by executing the display process 64. Further, the CPU 51 operates as the operation detection section 24 illustrated in FIG. 26 by executing the operation detection process 65. Further, the CPU 51 operates as the scroll detection section 26 illustrated in FIG. 26 by executing the scroll detection process 66. Further, the CPU 51 operates as the timing deciding section 630 illustrated in FIG. 26 by executing the timing deciding process 667. The computer 650, which executes the display program 660, thereby functions as the information processing terminal 616.

Note that the functionality implemented by the display program 660 may, for example, be implemented by a semiconductor integrated circuit, and more specifically, by an ASIC or the like.

Figure 30:
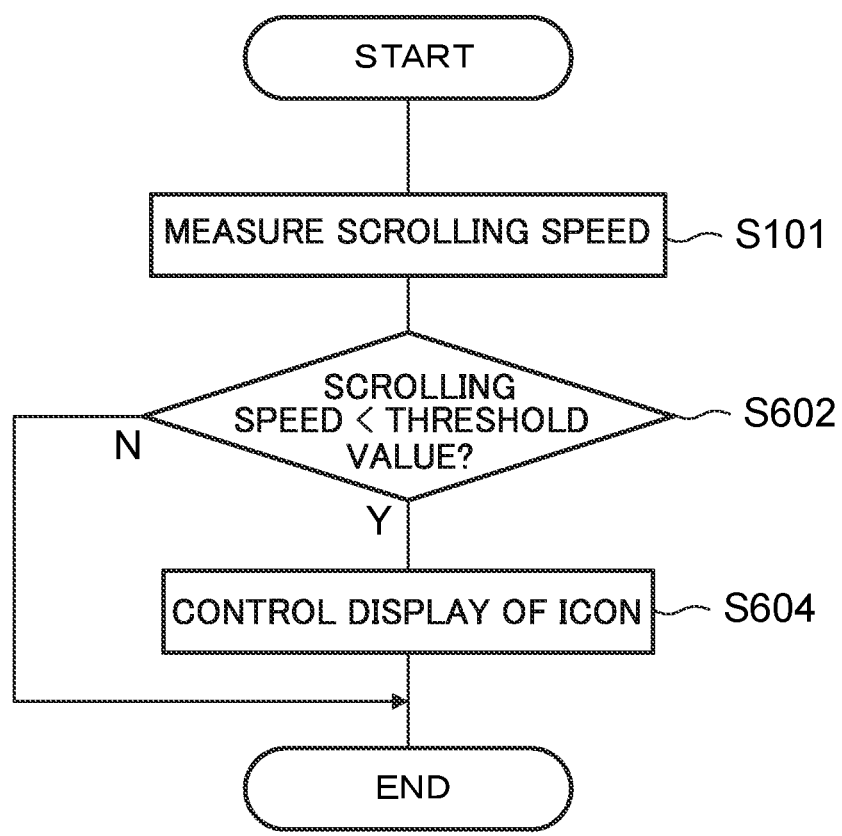
FIG. 30 is a flowchart illustrating an example of information presentation processing of the sixth exemplary embodiment.

Next, operation of the information presentation system 610 according to the sixth exemplary embodiment is described. In the information presentation system 610, the information processing terminal 616 receives content from the content server 12. Then, the received content is displayed on the display section 22 of the information processing terminal 616 and the operation detection section 24 receives input of operations by the user and measures the operation time of the operation. Then, in the information processing terminal 616, the information presentation processing illustrated in FIG. 30 is repeatedly executed in respective units of time. Each processing is described in detail below.

At step S101, the scroll detection section 26 detects the scrolled amount of the screen input by the user from the touch panel superimposed on the display section 22. The scroll detection section 26 then divides the scrolled amount by the scroll operation time to measure the scrolling speed (pixels/s).

At step S602, the timing deciding section 630 determines whether or not the scrolling speed measured at step S101 above is less than a pre-set threshold value. Processing transitions to step S604 in cases in which the scrolling speed measured at step S101 above is less than the pre-set threshold value. On the other hand, the information presentation processing ends in cases in which the scrolling speed measured at step S101 above is the pre-set threshold value or greater.

At step S602, the control section 620 controls such that the icon for receiving input of the user is displayed on the display section 22.

When the icon is displayed on the display section 22, the user checks the icon T being displayed and selects an operation button in accordance with the service the user desires to receive.

As described above, the information processing terminal according to the sixth exemplary embodiment measures the operation time of the operation in cases in which input of operation has been received while the content is being displayed on the information processing terminal. The information processing terminal then measures the scrolling speed, which is an example of a time-wise change of the content to be displayed, during the operation time, and, in accordance with the scrolling speed, displays an icon for receiving operations from the user in association with the content. This enables a service to be provided in accordance with the user state by presenting an icon in accordance with the user state.

Note that although a mode has been described in which the information presentation program or degree of interest evaluation program is pre-stored (installed) in the storage section, there is no limitation thereto. The program according to technology disclosed herein may be provided in a mode recorded to a recording medium such as a CD-ROM, DVD-ROM, or USB memory.

All cited documents, patent applications, and technical standards mentioned in the present specification are incorporated by reference in the present specification to the same extent as if each individual cited document, patent application, or technical standard was specifically and individually indicated to be incorporated by reference.

Next, modified examples of the exemplary embodiments are described.

In the exemplary embodiments above, the first, second, and sixth exemplary embodiments describe examples of cases in which deciding the message or deciding the timing of the display of the icon is performed at the information processing terminal-side. However, there is no limitation thereto. For example, deciding the message or deciding the timing of the display of the icon may be performed at the content server-side or at the operator terminal-side. Further, similarly, the third and fourth exemplary embodiments describe examples of cases in which the processing for deciding the message is performed at the content server-side. However, there is no limitation thereto. For example, the processing for deciding the message may be performed at the information processing terminal-side. Further, the fifth exemplary embodiment describes an example of a case in which the computation processing for the degree of interest is performed at the operator terminal-side. However, there is no limitation thereto. For example, the computation of the degree of interest may be performed at the information processing terminal-side.

Further, the first exemplary embodiment describes an example of a case in which the message to be displayed is decided on in accordance with the scrolling speed when deciding on the message to be displayed. However, there is no limitation thereto. For example, the message to be displayed may be decided on in accordance with the scroll operation time, which is an example of an operation time, and the scrolling speed. In such cases, when deciding on the message to be displayed, the level of interest of the user toward the content is determined to be higher the longer the scroll operation time, and the level of interest of the user toward the content is determined to be lower the shorter the scroll operation time. Then, the message to be displayed is decided on in accordance with the determined level of the interest of the user. Accordingly, when the message to be displayed is decided on, a message to be displayed that corresponds to a user having a relatively high level of interest toward the content is selected in cases in which the scroll operation time is longer than the predetermined threshold value. Further, a message to be displayed that corresponds to a user having a relatively low level of interest toward the content is selected in cases in which the scroll operation time is shorter than the predetermined threshold value. For example, determination is made such that for longer scroll operation times, the level of interest of the user toward the content is determined to be higher, information corresponding to "XXX" is acquired from the content, and a message stating "are you looking for XXX?" is presented. Further, determination is made such that for shorter scroll operation times, the determined level of interest of the user toward the content is determined to be lower, and a message stating, for example, "are you having trouble?" is presented.

Further, the sixth exemplary embodiment describes an example of a case in which the timing at which to display the icon is decided on in accordance with the scrolling speed. However, there is no limitation thereto. For example, configuration may be made such that the degree of interest is computed from the user operation information, the user state is identified in accordance with the degree of interest, and the timing at which to display the icon is decided on in accordance with the user state, as in the second to fifth exemplary embodiments. For example, configuration may be made to perform control such that the icon is displayed in cases in which the user state has been identified as any of the first state to the third state, or control is made to not display the icon in cases in which the user state has been identified as the fourth state.

Further, although the exemplary embodiments above described examples of cases in which the degree of interest was computed according to Equation (1) above, there is no limitation thereto. For example, computation may be made according to Equation (2) below.

$$I(t)=\Sigma(\text{zoom time/movement weight coefficient})+\Sigma\{(\text{scroll operation time}\cdot\text{zoom ratio})/(\text{scrolling speed weight coefficient}\cdot\text{movement weight coefficient})\}+\Sigma\{(\text{non-operation time}\cdot\text{zoom ratio})/\text{movement weight coefficient}\} \quad (2)$$

Zoom time in Equation (2) above represents the time out of the input operations by the user that was spent performing a zoom operation. Further, the zoom ratio represents a ratio by which the screen display is enlarged by the zoom operation. Further, the movement weight coefficient is a coefficient pre-set in accordance with the movement amount of the information processing terminal itself that the user is operating.

Further, although each of the exemplary embodiments describes an example of a case in which the input operations of the information processing terminal are implemented in a touch panel format, there is no limitation thereto. Any format may be employed to receive the input operations. For example, operation information including a scrolling speed input from, for example, a mouse may be measured in cases in which the information processing terminal is a personal computer.

Further, although the exemplary embodiments describe examples in which the messages illustrated in FIG. 3 and FIG. 10 above serve as examples of the message, there is no limitation thereto. Any type of message may be employed as long as the message corresponds to the user state.

Further, each of the exemplary embodiments above describes an example of processing to appropriately change the message to be presented to the user; for example, changing and outputting the message in accordance with scrolling speed is described in the first exemplary embodiment. Further, in a modified example of the first exemplary embodiment described above, the message is changed and output in accordance with the scroll operation time. Further, the message is changed and output in accordance with the degree of interest and the change amount of the degree of interest in the second exemplary embodiment.

For example, when the user views a website in cases that employ related technology, only recommendations for other content are made according to the level of the interestedness or interest of the user, and this is not sufficient service.

One aspect of technology disclosed herein enables appropriate messages corresponding to a user state to be presented.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A degree of interest evaluation device comprising:
   a memory; and
   a processor coupled to the memory, the processor being configured to:
      in cases in which input of a scroll operation by a user has been received while content is displayed on an information processing terminal, detect a scrolled amount on a screen by the scroll operation and a scroll operation time of the scroll operation;
      associate a scroll speed below a predetermined threshold with a first written message corresponding to a lower interest of the user and associate a scroll speed above the predetermined threshold with a second written message corresponding to a higher interest of the user;
      store the association of the scroll speed below the predetermined threshold to the first written message and storing the association of the scroll speed above the predetermined threshold to the second written message in advance;
      determine a scroll speed based on the scrolled amount and the scroll operation time;
      decide to display either the first written message or the second written message in accordance with the determined scroll speed;
      when the determined scroll speed is below the predetermined threshold, select the first written message to be displayed and display the first written message; and
      when the determined scroll speed is above the predetermined threshold, selecting the second written message to be displayed and displaying the second written message.

2. The degree of interest evaluation device of claim 1, wherein the processor is further configured to:
   associate a scroll speed and a message and store the associated scroll speed and the message in advance; and
   set the message so as to correspond to a state in which the interest of the user is relatively lower, as the scroll speed is faster,
   wherein, the deciding on the message to be displayed includes:
      selecting a message to be displayed that has been stored associated to the scroll speed.

3. A non-transitory recording medium storing a degree of interest evaluation program that causes a computer to execute a process, the process comprising:
   in cases in which input of a scroll operation by a user has been received while content is displayed on an information processing terminal, detecting a scrolled amount on a screen by the scroll operation and a scroll operation time of the scroll operation;
   associating a scroll speed below a predetermined threshold with a first written message corresponding to a lower interest of the user and associating a scroll speed above the predetermined threshold with a second written message corresponding to a higher interest of the user;
   storing the association of the scroll speed below the predetermined threshold to the first written message and storing the association of the scroll speed above the predetermined threshold to the second written message in advance;
   determining a scroll speed based on the scrolled amount and the scroll operation time;
   deciding to display either the first written message or the second written message in accordance with the determined scroll speed;
   when the determined scroll speed is below the predetermined threshold, selecting the first written message to be displayed and displaying the first written message; and
   when the determined scroll speed is above the predetermined threshold, selecting the second written message to be displayed and displaying the second written message.

4. The non-transitory recording medium of claim 3, the process further comprising:
   associating a scroll speed and a message and storing the associated scroll speed and the message in advance; and setting the message so as to correspond to a state in which the interest of the user is relatively lower, as the scroll speed is faster, wherein, in the process, the deciding on the message to be displayed includes:

selecting a message that has been stored associating to the scroll speed.

* * * * *